(12) United States Patent
Nagai et al.

(10) Patent No.: US 6,580,689 B1
(45) Date of Patent: Jun. 17, 2003

(54) METHOD AND APPARATUS FOR GENERATING INTRANODE ALTERNATE ROUTE

(75) Inventors: Takehiko Nagai, Osaka (JP); Tatsuo Sakamoto, Osaka (JP); Youichi Fukuda, Osaka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/198,206

(22) Filed: Nov. 23, 1998

(30) Foreign Application Priority Data

Mar. 19, 1998 (JP) .......................................... 10-070694

(51) Int. Cl.[7] .............................. H04J 1/16; H04L 1/22
(52) U.S. Cl. ............................ 370/227; 370/228; 714/3
(58) Field of Search ............................... 370/225, 226, 370/227, 228; 714/1, 2, 3, 4

(56) References Cited

U.S. PATENT DOCUMENTS

| | | | | |
|---|---|---|---|---|
| 4,242,756 A | * | 12/1980 | Huffman et al. ............... | 455/8 |
| 4,477,895 A | * | 10/1984 | Casper et al. ............... | 370/228 |
| 4,598,399 A | * | 7/1986 | Bath ......................... | 370/226 |
| 5,173,689 A | * | 12/1992 | Kusano ....................... | 340/827 |
| 5,398,236 A | * | 3/1995 | Hemmady et al. ........... | 370/218 |
| 5,586,112 A | * | 12/1996 | Tabata ....................... | 370/225 |
| 5,663,949 A | * | 9/1997 | Ishibashi et al. ........... | 370/220 |
| 5,715,237 A | * | 2/1998 | Akiyoshi ..................... | 370/228 |
| 5,793,746 A | * | 8/1998 | Gerstel et al. .............. | 370/228 |
| 5,930,249 A | * | 7/1999 | Stademann et al. .......... | 370/351 |
| 5,991,263 A | * | 11/1999 | Bales et al. ................. | 370/225 |
| 5,999,286 A | * | 12/1999 | Venkatesan .................. | 359/117 |

* cited by examiner

Primary Examiner—Min Jung
(74) Attorney, Agent, or Firm—Katten Muchin Zavis Rosenman

(57) ABSTRACT

The present invention concerns a communication node accommodating terminals for various kinds of media, and more particularly the invention provides an intranode alternate route generation method and apparatus for generating an alternate route as needed within the node when a failure or congestion occurs in line control equipment in a line accommodating section of the node. According to the invention, in a node having a line accommodating section comprising a plurality of line connection equipments and line control equipments and an exchange section for performing switching of signals supplied from said line accommodating section, an intranode alternate route generation apparatus for generating an alternate route within the node, comprises:

detecting means for detecting an unusable condition when any one of the line control equipments becomes unusable;

extracting means for extracting idle channels from channels accommodated in another operating line control equipment when the unusable condition is detected; and linking means for dynamically linking the channels accommodated in the unusable line control equipment to the extracted idle channels in that other operating line control equipment by way of an alternate route.

21 Claims, 31 Drawing Sheets

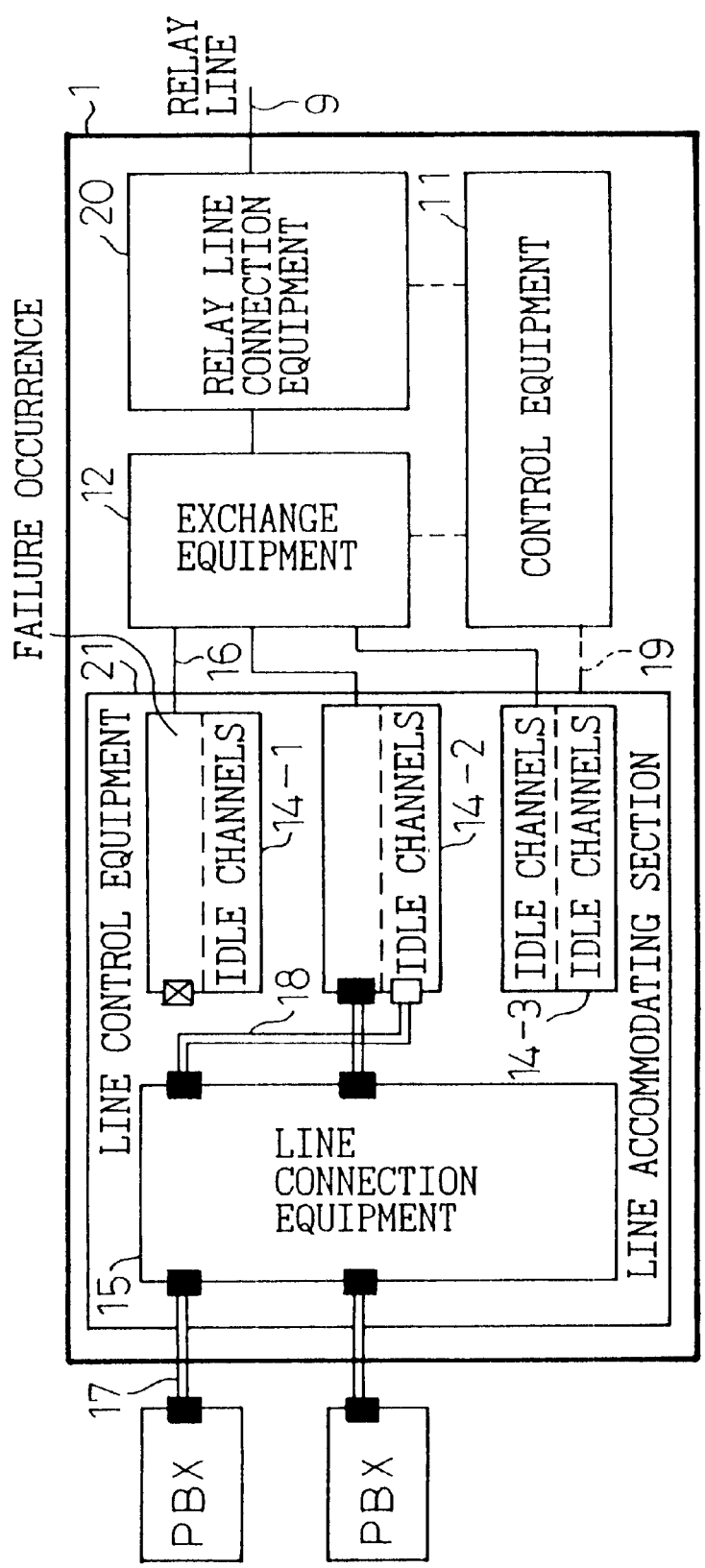

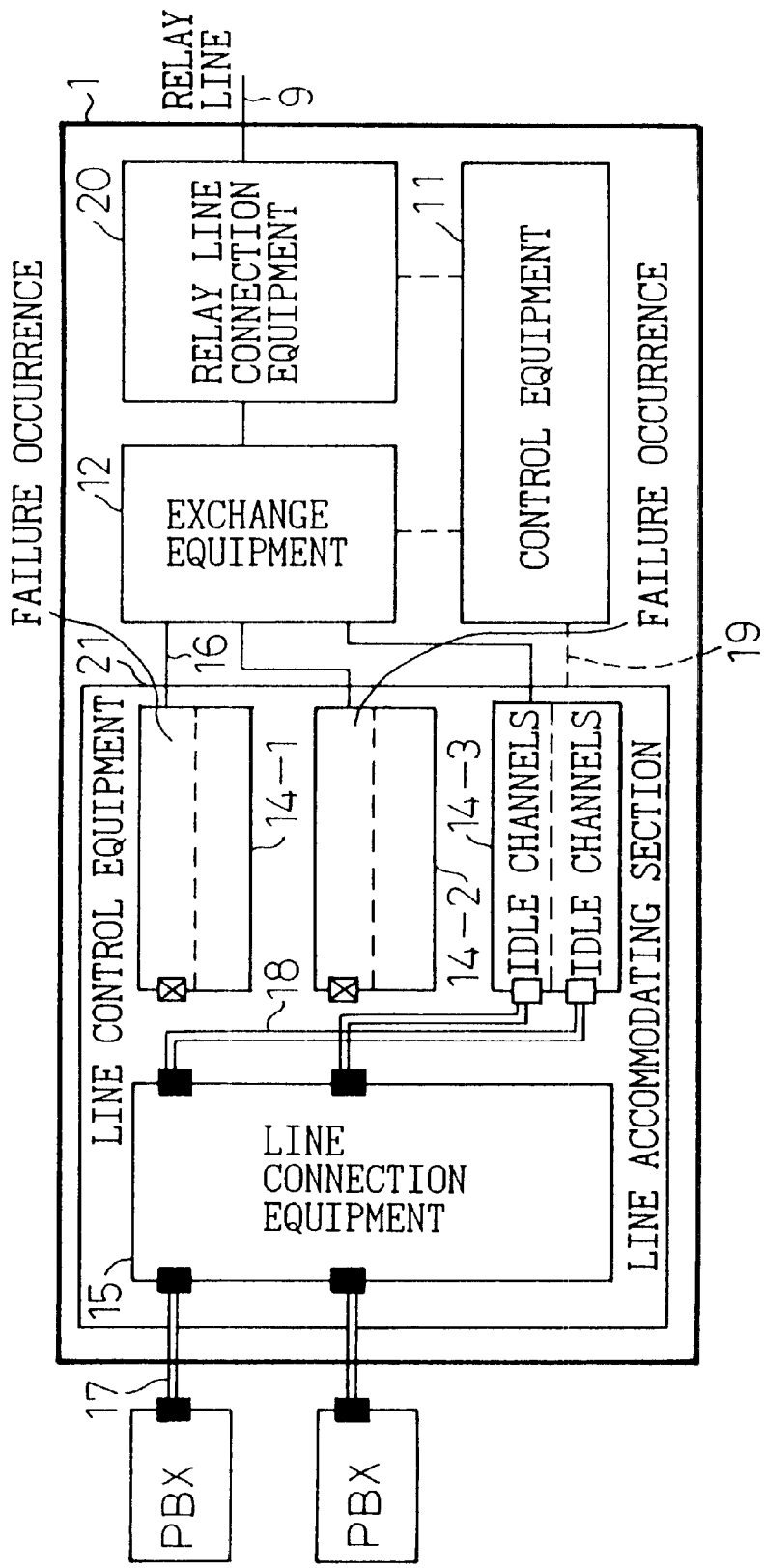

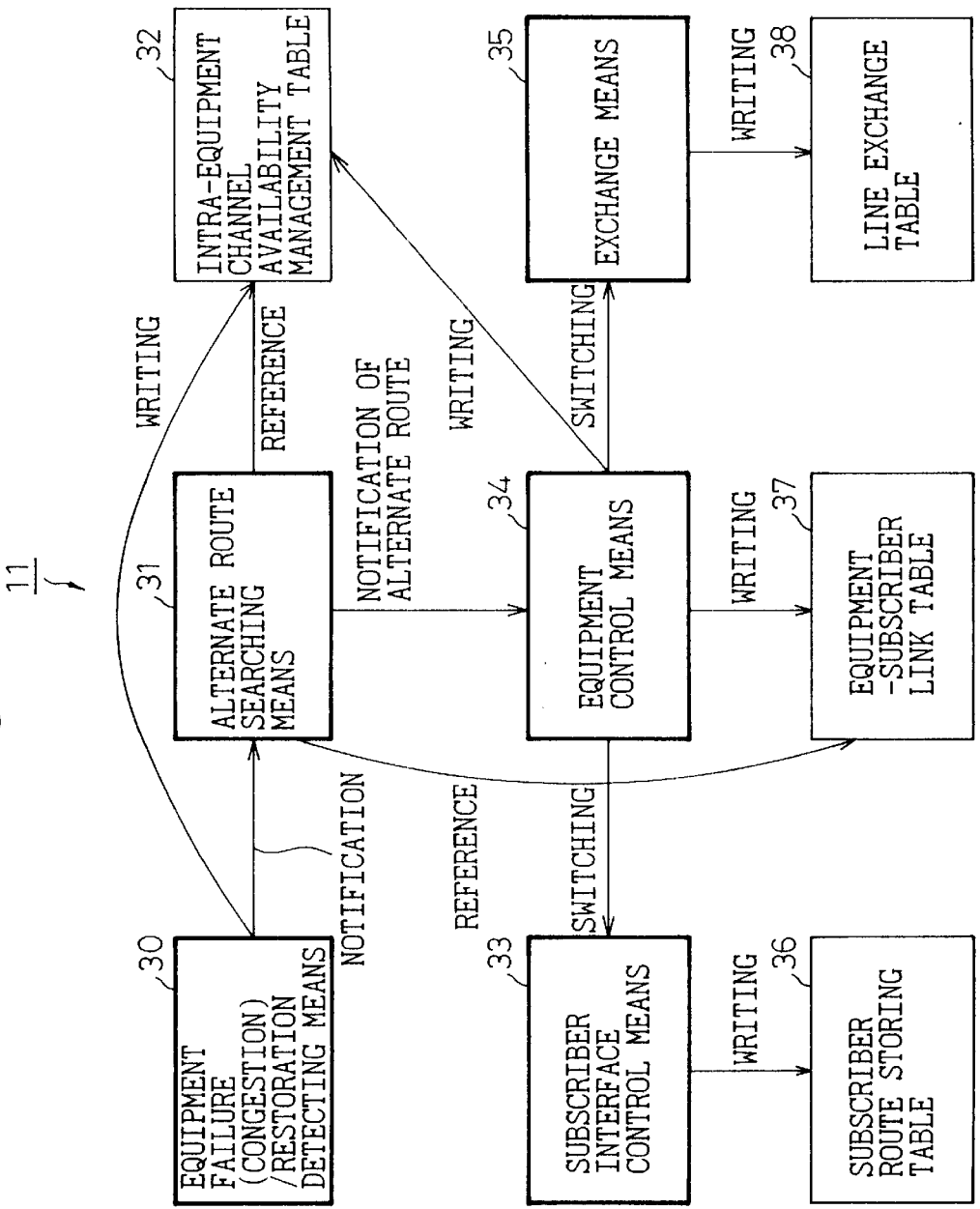

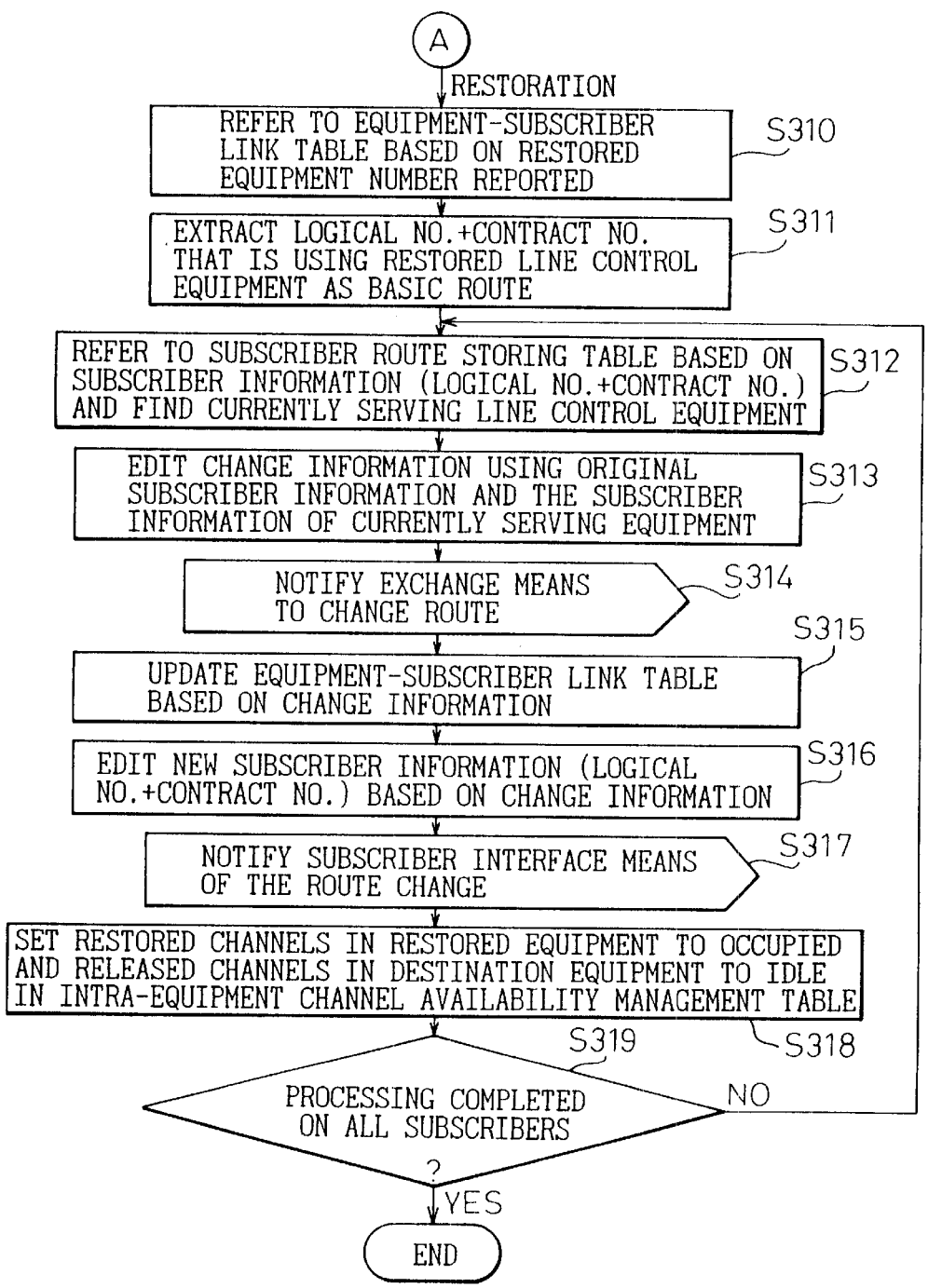

Fig.13A
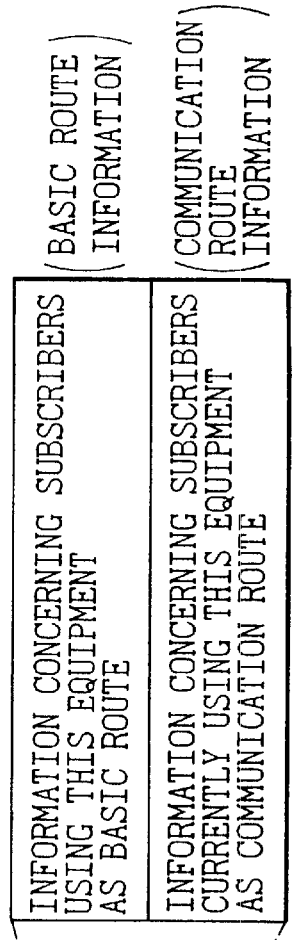
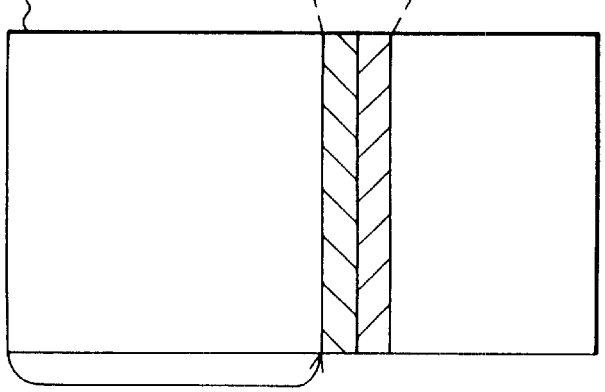
EQUIPMENT-SUBSCRIBER LINK TABLE ~37
INDEXED BY EQUIPMENT NUMBER
INFORMATION CONCERNING SUBSCRIBERS USING THIS EQUIPMENT AS BASIC ROUTE (BASIC ROUTE INFORMATION)
INFORMATION CONCERNING SUBSCRIBERS CURRENTLY USING THIS EQUIPMENT AS COMMUNICATION ROUTE (COMMUNICATION ROUTE INFORMATION)

Fig.14A
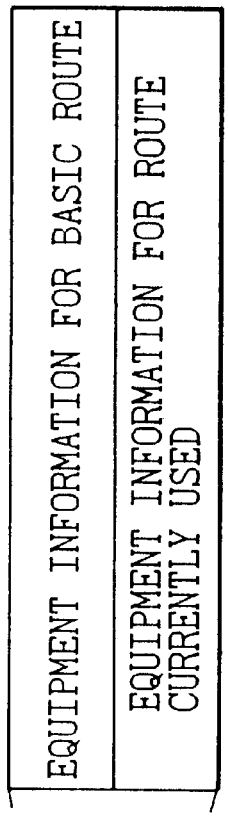
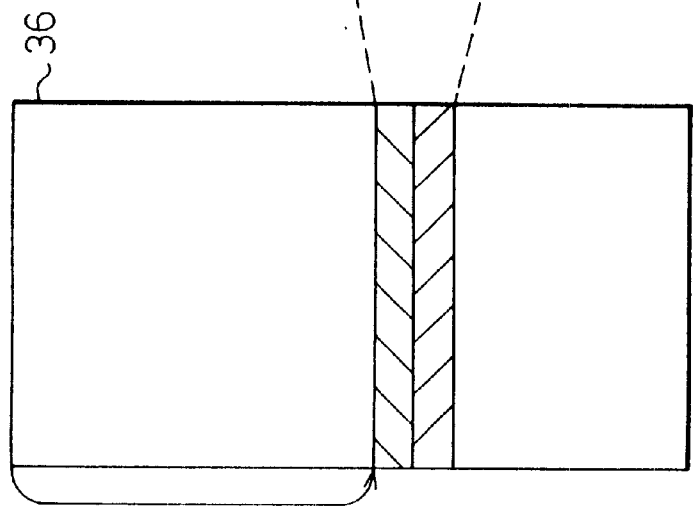

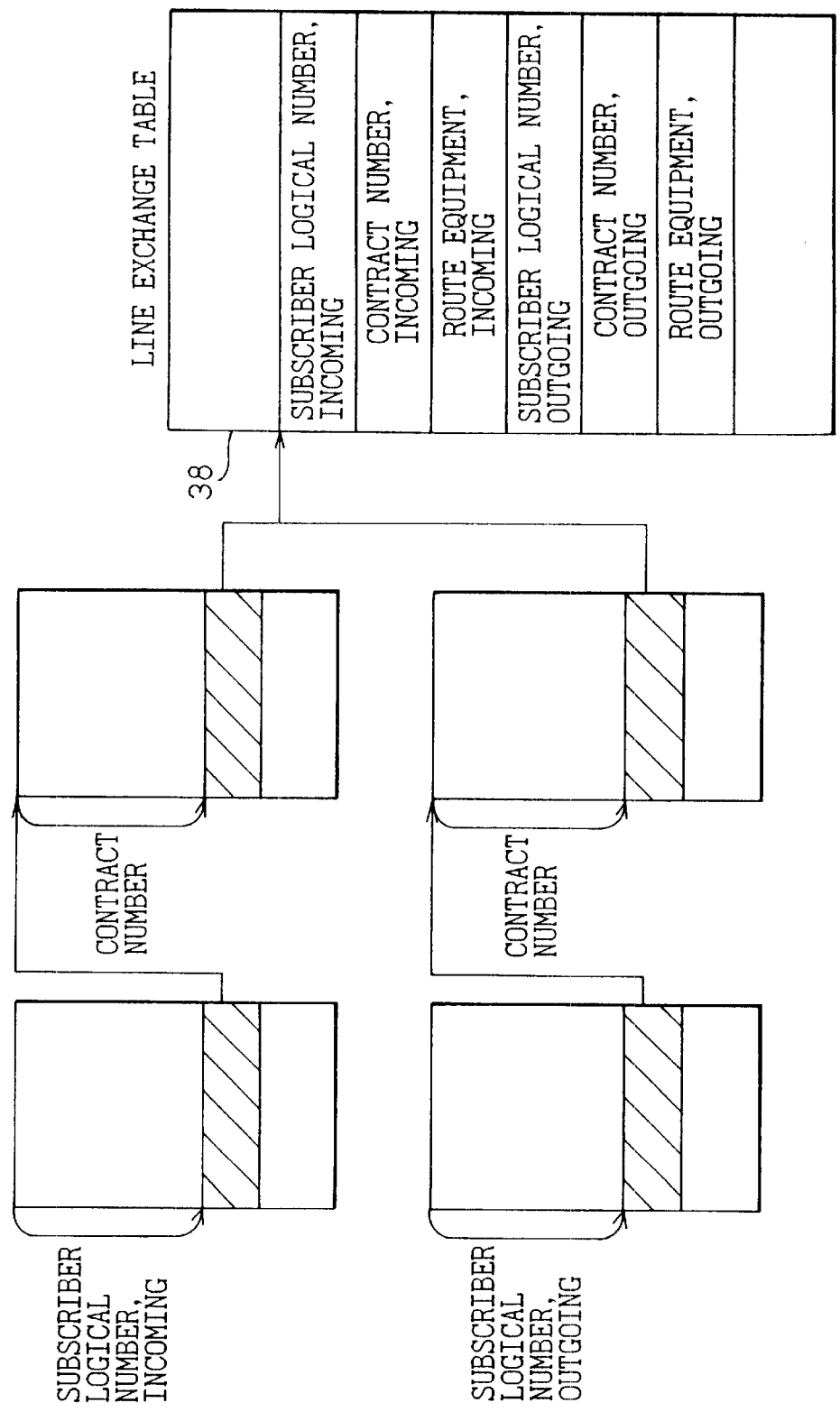

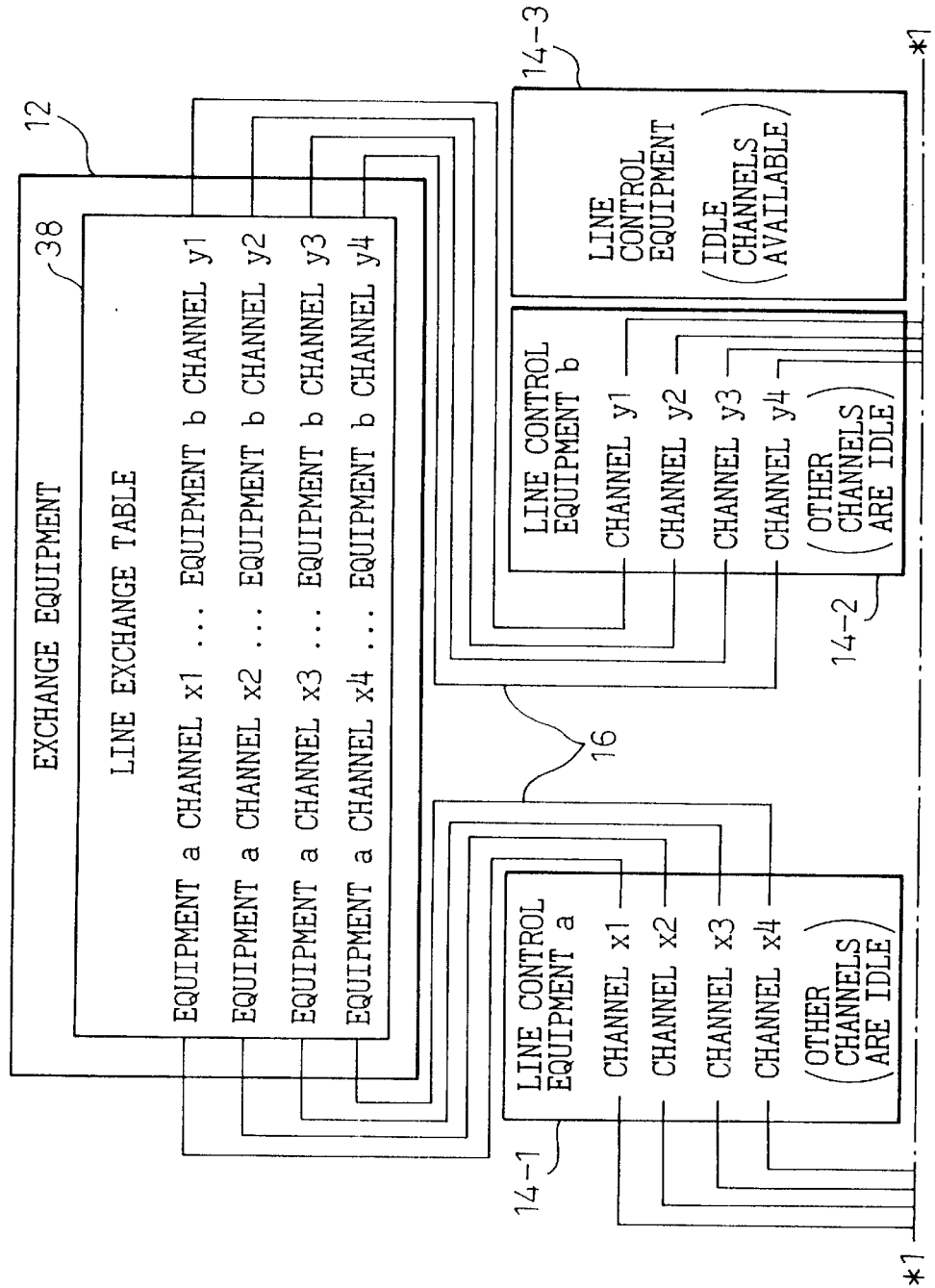

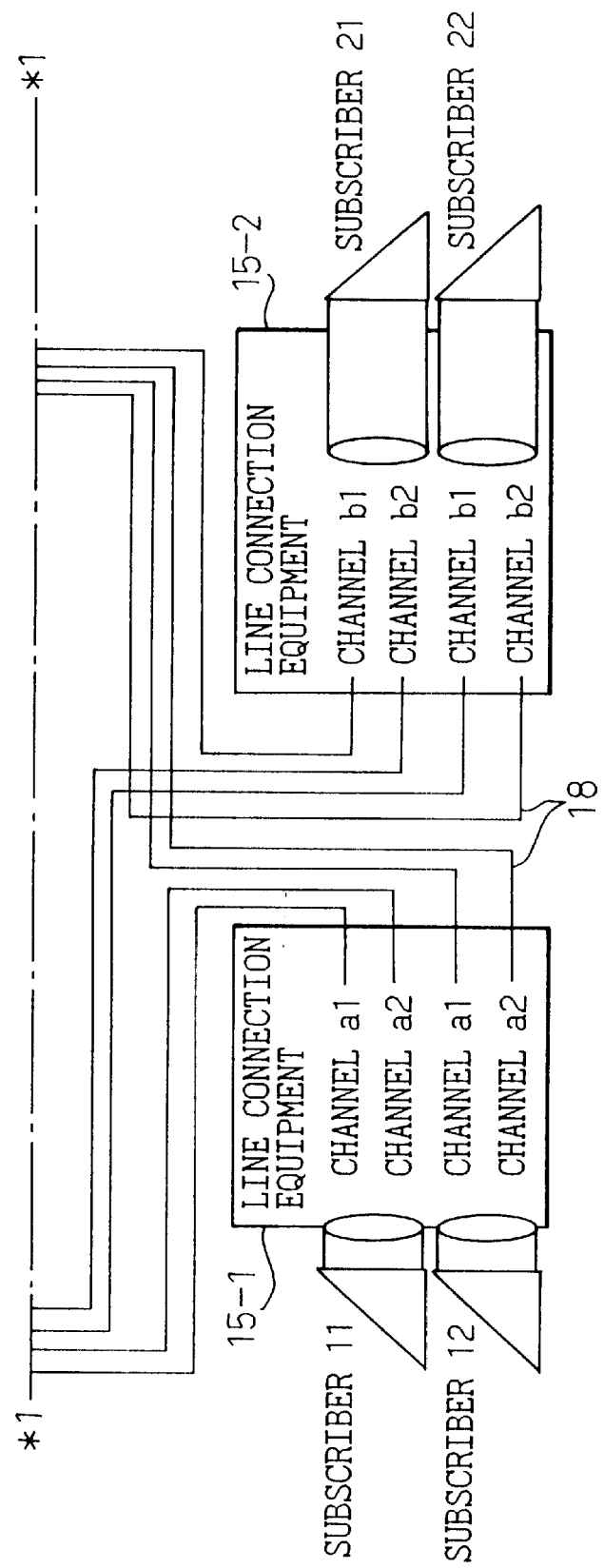

Fig.17A

| TABLE BLOCK INDEXED BY EQUIPMENT 14-1 | | | |
|---|---|---|---|
| NUMBER OF SUBSCRIBERS: 4 | | | |
| SUBSCRIBER LOGICAL NUMBER: 11 | CONTRACT NUMBER: 1 | STARTING CHANNEL: x1 | NUMBER OF CHANNELS: 1 |
| SUBSCRIBER LOGICAL NUMBER: 11 | CONTRACT NUMBER: 2 | STARTING CHANNEL: x2 | NUMBER OF CHANNELS: 1 |
| SUBSCRIBER LOGICAL NUMBER: 21 | CONTRACT NUMBER: 2 | STARTING CHANNEL: x3 | NUMBER OF CHANNELS: 1 |
| SUBSCRIBER LOGICAL NUMBER: 22 | CONTRACT NUMBER: 1 | STARTING CHANNEL: x4 | NUMBER OF CHANNELS: 1 |
| NUMBER OF SUBSCRIBERS: 4 | | | BASIC ROUTE |
| SUBSCRIBER LOGICAL NUMBER: 11 | CONTRACT NUMBER: 1 | STARTING CHANNEL: x1 | NUMBER OF CHANNELS: 1 |
| SUBSCRIBER LOGICAL NUMBER: 11 | CONTRACT NUMBER: 2 | STARTING CHANNEL: x2 | NUMBER OF CHANNELS: 1 |
| SUBSCRIBER LOGICAL NUMBER: 21 | CONTRACT NUMBER: 2 | STARTING CHANNEL: x3 | NUMBER OF CHANNELS: 1 |
| SUBSCRIBER LOGICAL NUMBER: 22 | CONTRACT NUMBER: 1 | STARTING CHANNEL: x4 | NUMBER OF CHANNELS: 1 |
| | | | COMMUNICATION ROUTE |

37

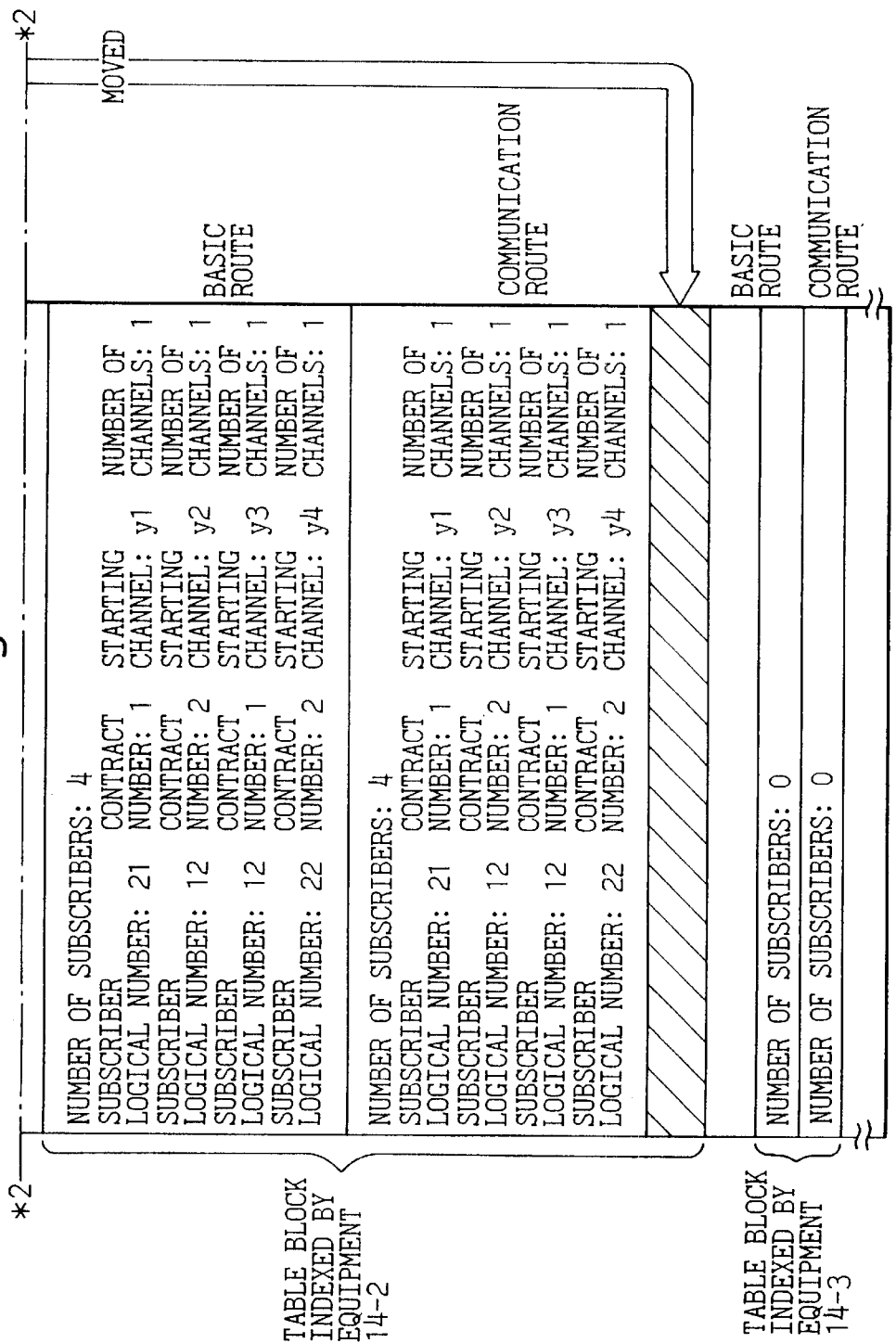

Fig.18A

| | | |
|---|---|---|
| TABLE BLOCK INDEXED BY SUBSCRIBER LOGICAL NUMBER 11 | NUMBER OF CONTRACT CHANNELS: 2<br>EQUIPMENT a  STARTING CHANNEL: x1  NUMBER OF CHANNELS: 1<br>EQUIPMENT a  STARTING CHANNEL: x2  NUMBER OF CHANNELS: 1 | BASIC ROUTE |
| | NUMBER OF CONTRACT CHANNELS: 2<br>EQUIPMENT a  STARTING CHANNEL: x1  NUMBER OF CHANNELS: 1<br>EQUIPMENT a  STARTING CHANNEL: x2  NUMBER OF CHANNELS: 1 | COMMUNICATION ROUTE |
| TABLE BLOCK INDEXED BY SUBSCRIBER LOGICAL NUMBER 12 | NUMBER OF CONTRACT CHANNELS: 2<br>EQUIPMENT b  STARTING CHANNEL: y2  NUMBER OF CHANNELS: 1<br>EQUIPMENT b  STARTING CHANNEL: y3  NUMBER OF CHANNELS: 1 | BASIC ROUTE |
| | NUMBER OF CONTRACT CHANNELS: 2<br>EQUIPMENT b  STARTING CHANNEL: y2  NUMBER OF CHANNELS: 1<br>EQUIPMENT b  STARTING CHANNEL: y3  NUMBER OF CHANNELS: 1 | COMMUNICATION ROUTE |

| | | |
|---|---|---|
| TABLE BLOCK INDEXED BY SUBSCRIBER LOGICAL NUMBER 21 | NUMBER OF CONTRACT CHANNELS: 2<br>EQUIPMENT b STARTING CHANNEL: y1  NUMBER OF CHANNELS: 1<br>EQUIPMENT a STARTING CHANNEL: x4  NUMBER OF CHANNELS: 1 | BASIC ROUTE |
| | NUMBER OF CONTRACT CHANNELS: 2<br>EQUIPMENT b STARTING CHANNEL: y1  NUMBER OF CHANNELS: 1<br>EQUIPMENT a STARTING CHANNEL: x4  NUMBER OF CHANNELS: 1 | COMMUNICATION ROUTE |
| TABLE BLOCK INDEXED BY SUBSCRIBER LOGICAL NUMBER 22 | NUMBER OF CONTRACT CHANNELS: 2<br>EQUIPMENT a STARTING CHANNEL: x3  NUMBER OF CHANNELS: 1<br>EQUIPMENT b STARTING CHANNEL: y4  NUMBER OF CHANNELS: 1 | BASIC ROUTE |
| | NUMBER OF CONTRACT CHANNELS: 2<br>EQUIPMENT a STARTING CHANNEL: x3  NUMBER OF CHANNELS: 1<br>EQUIPMENT b STARTING CHANNEL: y4  NUMBER OF CHANNELS: 1 | COMMUNICATION ROUTE |

CONTENTS ARE UPDATED IN THE EVENT OF FAILURE OF EQUIPMENT a

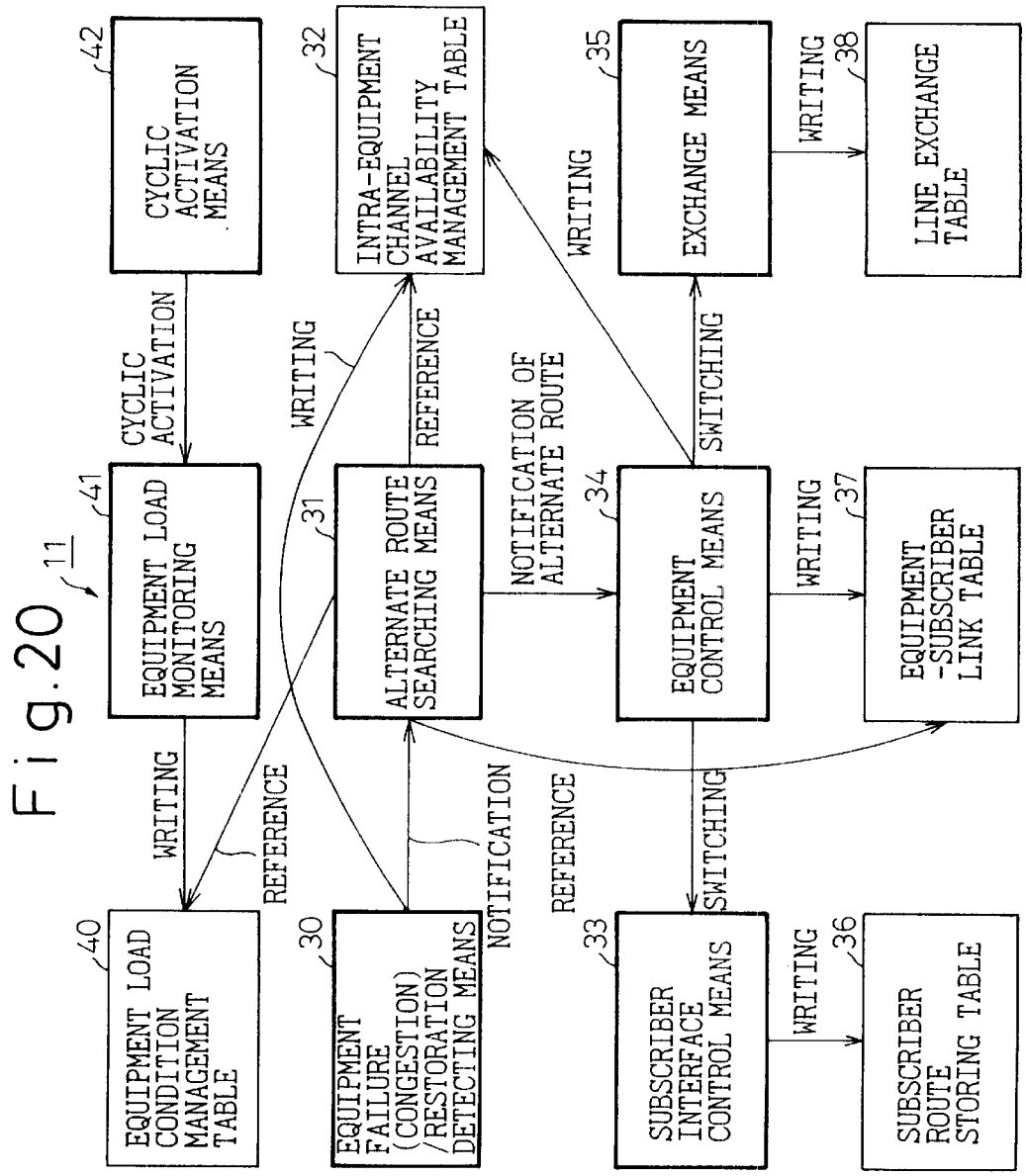

STATISTICAL INFORMATION RECORDING TABLE

EQUIPMENT LOAD CONDITION MANAGEMENT TABLE

METHOD AND APPARATUS FOR GENERATING INTRANODE ALTERNATE ROUTE

BACKGROUND OF THE INVENTION

1. Field of the Invention

The present invention relates to a communication node accommodating terminals of various kinds of media connected via various kinds of lines such as a high-speed digital leased line, an ultra-high-speed digital leased line, an ATM megalink service, and the like, and more particularly to an intranode alternate route generation method and apparatus for generating an alternate route as needed within the communication node when a failure or congestion occurs in line control equipment in a line accommodating section of the node.

2. Description of the Prior Art

FIG. 1 is a diagram showing one example of a communication node to which the present invention is applied.

In FIG. 1, the node 1 is a node generally called an ATM-WAN (Asynchronous Transfer Mode Wide Area Network) node which performs ATM transmission to and from other nodes by cell-multiplexing information from terminals of various media using lines such as a high-speed digital leased line, an ultra-high-speed digital leased line, an ATM megalink service, and the like.

As shown in FIG. 1, the node 1 accommodates, in addition to a conventional PBX and data terminals 2, various kinds of communication media such as a frame relay unit 4, ATM terminals (ATM TEs) 8, a time division unit (TDM) 5, a multiplexing unit (MIX) 6, and a wide area network (WAN) 7. The node 1 converts a signal from each of the media into an ATM signal which is then cell-multiplexed for ATM transmission over a high-speed line 9 to another similar node. Thus, a wide area network using ATM (ATM-WAN) is formed by interconnecting a plurality of such nodes 1.

FIG. 2 is a diagram showing an example of the basic configuration of a line accommodating section in the node 1 of FIG. 1.

In FIG. 2, line connection equipment 15 accommodates subscriber lines 17 to which the various kinds of media are connected. The example of the line connection equipment 15 shown here accommodates a conventional PBX and data terminals or the like, and is tasked with terminating voice/data signals transferred between the PBX and the data terminals, etc. and with performing the mapping between the terminated signals and prescribed time slot signals time-division multiplexed in units of slots on a TDM bus 18 within the node.

A time-division switch (TSW) 13 is responsible for the switching and path management of each of the time slot signals flowing along the TDM bus 18. In the path management, one or more time slot signals are assigned onto the TDM bus 18 in accordance with the bandwidth of each subscriber contract line. In this way, a path bandwidth is assigned for each logical path of a subscriber onto the TDM bus 18.

Clad equipment (CLAD) 14 is a TDM-ATM conversion processing unit which performs conversion to and reconversion from ATM cells by performing cell assembly/disassembly between the prescribed time slot signal flowing along the TDM bus 18 and the ATM cell signal on a UTOPIA bus 16 along which ATM cells flow.

An ATM switch (ATM-SW) 12 is an exchange apparatus for switching the ATM cell signal on the UTOPIA bus 16. Control equipment 11 is a central processing unit of the node 1 and performs control of all the units and lines accommodated in the node 1 via the control paths shown by dashed lines in FIG. 2.

FIG. 3 is a diagram showing an example of the configuration of a line accommodating section in a prior art node.

In FIG. 3, the same parts as those shown in FIGS. 1 and 2 are designated by the same reference numerals, and such parts will not be further described here. The line accommodating section of the prior art comprises a line connection equipment 15 and line control equipments 14-1 and 14-2 arranged in a dual configuration. Each line control equipment 14-1 or 14-2 corresponds to the clad equipment 14 of FIG. 2, one being configured as a working unit and the other as a backup unit.

In this configuration, when a failure occurs in the working line control equipment 14-1, rendering it unusable or inoperative, control is switched to the backup line control equipment 14-2 in order to maintain and continue the current communication conditions. In this way, for the selection/generation of an alternate route within the prior art node 1, the backup equipment 14-2 dedicated to alternate routing is provided and, in the event of a failure or the like, the lines accommodated in the failed equipment 14-1 are immediately switched to the backup equipment 14-2 to form the alternate route.

In the prior art, therefore, since redundant equipment dedicated to alternate routing has had to be provided, the number of equipments that can be used in normal operation has been limited, leading to the problem that the equipment utilization in the node as a whole is reduced or limited. The prior art configuration described above has also had the problem that when a failure also occurs in the backup equipment (a double failure), no further alternate routing can be performed.

SUMMARY OF THE INVENTION

In view of the above-outlined problems, it is an object of the present invention to provide an intranode alternate route generation method and apparatus wherein, in a node having a line accommodating section comprising a plurality of line connection equipments and line control equipments, when a failure or congestion occurs in one line control equipment, an alternate route is formed by using idle logical channels available in another operating line control equipment.

It is another object of the present invention to provide an intranode alternate route generation method and apparatus wherein, when the failed line control equipment is restored from the failure or congestion, the alternate route provided in another line control equipment is released and switched back to the original route.

It is a further object of the present invention to provide an intranode alternate route generation method and apparatus wherein, when performing the selection or switching back of the alternate route, the route is selected for the most suitable line control equipment at that time using statistical information on failure/congestion, etc. or the route is switched back accordingly.

The intranode alternate route generation method and apparatus are applied to all operating line control equipments, and their alternate routes are dynamically generated/formed and released. Accordingly, in the present invention, there is no need to provide redundant equipment such as backup equipment, and if one line control equipment becomes unusable, the efficiency of equipment operation is unaffected as long as corresponding idle logical channels are available in other equipment.

Furthermore, as long as idle logical channels are available in other equipment, line control operations can be continued without interruption even in the event of a double failure condition. Furthermore, when selecting or restoring the route, the most suitable line control equipment at that instant in time is selected based on the failure/congestion statistical information, ensuring proper equipment operation and maintenance.

According to the present invention, there is provided, in a node having a line accommodating section comprising a plurality of line connection equipments and line control equipments and an exchange section for performing switching of signals supplied from the line accommodating section, an intranode alternate route comprising: detecting means for detecting an unusable condition when any one of the line control equipments becomes unusable; extracting means for extracting idle channels from channels accommodated in another operating line control equipment when the unusable condition is detected; and linking means for dynamically linking the channels accommodated in the unusable line control equipment to the extracted idle channels, in that other operating line control equipment, by way of an alternate route.

Preferably, one or more line control equipments are designated by the linking means as destinations of the linking. When the line control equipment designated by the linking means as the destination of the alternate route becomes unusable, an alternate route is formed to still another operating line control equipment.

The detecting means further detects a usable condition when said unusable line control equipment is restored and becomes usable and, in response to the detection of the usable condition, the linking means switches back the alternate route associated with the channels originally accommodated in the restored line control equipment. When switching back the alternate route, the linking means uses basic route information which records initially accommodated channels for each line control equipment.

The apparatus further includes information collecting means for collecting information concerning the condition of each line control equipment, and based on the information from the information collecting means, the extracting means preferentially extracts idle channels from channels accommodated in a line control equipment having higher reliability. The information collected by the information collecting means contains the number of idle channels, the number of occurrences of a failure, resource information, or load information for each line control equipment. In this case, alarm means outputs alarm information when the total number of idle channels available between each line control equipment drops below a predetermined value.

BRIEF DESCRIPTION OF THE DRAWINGS

The present invention will be more clearly understood from the description as set forth below with reference to the accompanying drawings.

FIGS. 4A to 4C are diagrams showing the operating principles of an intranode alternate route generation apparatus according to the present invention.

FIG. 5 is a diagram showing an example (1) of the basic configuration of the intranode alternate route generation apparatus according to the present invention.

FIG. 10 is a diagram showing an example of a processing flow (2) in the equipment control means.

FIGS. 13A and 13B are diagrams showing an example of an equipment-subscriber link table.

FIGS. 14A and 14B are diagrams showing an example of a subscriber route storing table.

FIG. 15 is a diagram showing an example of a line exchange table.

FIGS. 16A and 16B are diagrams showing a specific example of equipment configuration.

FIGS. 17A and 17B are diagrams showing an example of how the equipment-subscriber link table in FIGS. 16A and 16B is set.

FIGS. 18A and 18B are diagrams showing an example of how the subscriber route storing table in FIGS. 16A and 16B is set.

FIG. 20 is a diagram showing an alternative embodiment (2) of the intranode alternate route generation apparatus according to the present invention.

DESCRIPTION OF THE PREFERRED EMBODIMENTS

Figure 4A:
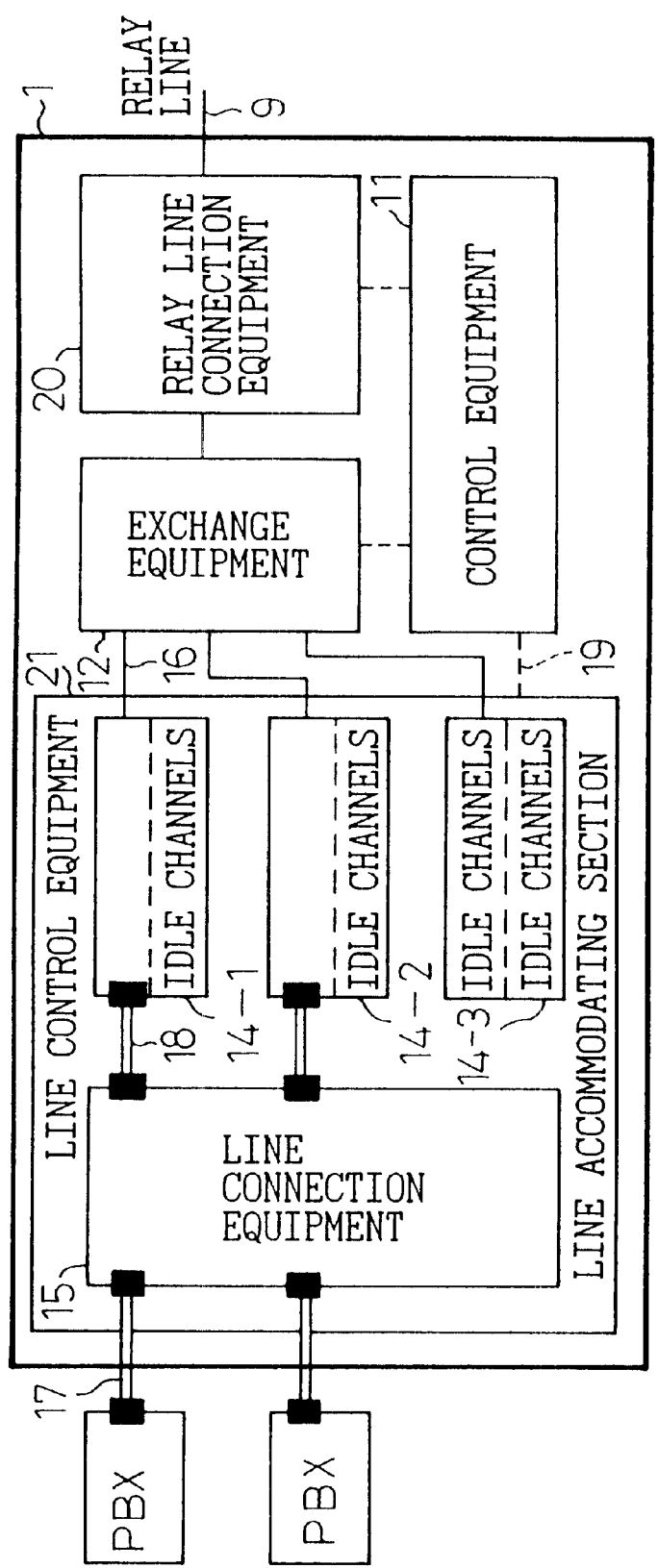

FIGS. 4A to 4C are diagrams showing the operating principles of an intranode alternate route generation apparatus according to the present invention. FIG. 4A shows an example of equipment configuration within a node in normal operation, FIG. 4B shows an example of equipment configuration when a failure has subsequently occurred in line control equipment 14-1, and FIG. 4C shows an example of equipment configuration when a failure has also occurred in line control equipment 14-2. Here, the intranode alternate route generation apparatus according to the present invention is implemented in the form of a function of control equipment 11.

In FIG. 4A, of the operating line control equipments 14-1 to 14-3, the line control equipments 14-1 and 14-2 are currently being used for subscriber (PBX) line control, and the remaining line control equipment 14-3 is in an unused (idle) condition. If a failure occurs in the line control equipment 14-1, rendering it unusable, as shown in FIG. 4B, the intranode alternate route generation apparatus within the control equipment 11 extracts the number of idle logical channels available in the other operating control equipments 14-2 and 14-3 capable of accommodating the subscribers currently being served by the failed line control equipment 14-1.

In the illustrated example, the intranode alternate route generation apparatus selects the line control equipment 14-2 as the destination of alternate routing, based on such criteria as internal priority selection logic and the requirements for the number of idle logical channels available to accommodate the subscribers currently being served by the failed line control equipment 14-1. As a result, the subscribers currently being served by the failed line control equipment 14-1 are rerouted to the selected line control equipment 14-2, and the paths between the faulty line control equipment 14-1 and the affected subscribers are released.

FIG. 4C shows the case (an example of double failure) in which a failure has also occurred in the line control equipment 14-2 selected as the destination of alternate routing. In this case also, the intranode alternate route generation apparatus extracts the number of idle logical channels available to accommodate the subscribers currently being served by the failed line control equipment 14-2 in the same manner as earlier described and, based on the internal priority logic, selects, in the illustrated example, the idle line control equipment 14-3 as the destination of alternate routing. Here again, rerouting to the new paths and releasing of the old paths are performed.

The above description has dealt with the operations for generating an alternate route in the event of a failure, but the invention does not stop here; rather, when the faulty line control equipment is restored from the failure, path restoration processing is performed based on basic route information which is information concerning the subscribers initially accommodated in the restored line control equipment, and on communication route information which includes the current alternate route information.

For example, when the line control equipment 14-1 is restored after the generation of an alternate route, the original basic route is restored to the line control equipment 14-1 based on the basic route information (see FIG. 4A). After that, the corresponding alternate route in another line control equipment 14-2 (in the case of FIG. 4B) or line control equipment 14-3 (in the case of FIG. 4C) is released based on the communication route information.

In this way, in the present invention, there is no need to provide redundant equipment for the selection/generation of an alternate route in case the working line control equipment is rendered unsuitable for use. Furthermore, alternate route generation and restoration therefrom are performed efficiently and dynamically by selectively using operable idle logical channels.

Figure 6:
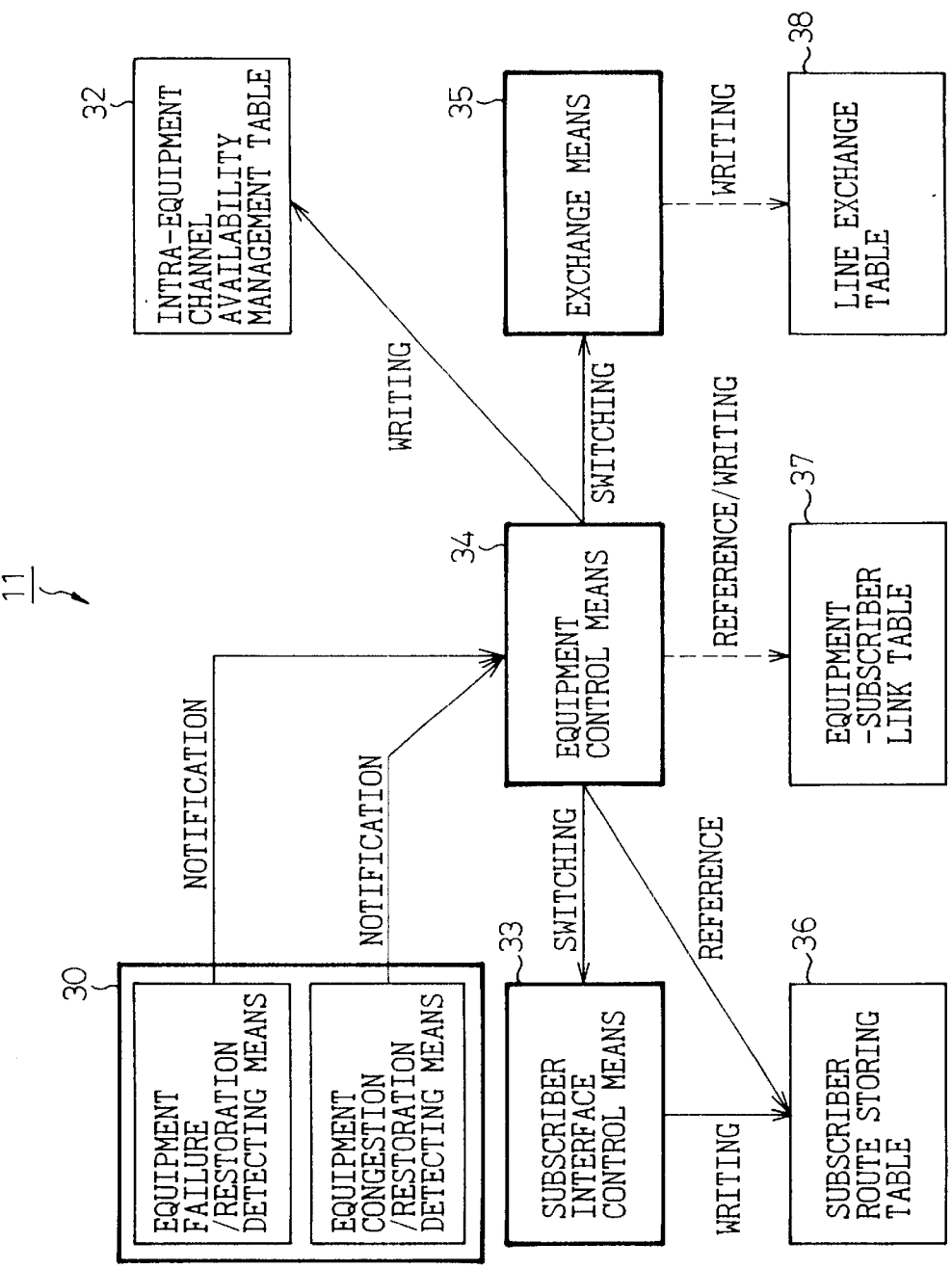
FIG. 6 is a diagram showing an example (2) of the basic configuration of the intranode alternate route generation apparatus according to the present invention.

FIGS. 5 and 6 are diagrams showing the basic configuration of the intranode alternate route generation apparatus according to the present invention. FIG. 5 shows an example of an equipment configuration at the time of failure (congestion) processing, and FIG. 6 shows an example of an equipment configuration at the time of restoration from the failure (congestion). As previously stated, the intranode alternate route generation apparatus itself is implemented in the form of a function of the control equipment 11.

In the failure (congestion) processing of FIG. 5, an equipment failure (congestion)/restoration detecting means 30 monitors the condition of each line control equipment provided within the node and detects a failure condition (including congestion) of the line control equipment. In response to a failure detection notification from the equipment failure (congestion)/restoration detecting means 30, an alternate route searching means 31 searches for another operating line control equipment capable of accommodating the subscribers currently being served by the failed line control equipment, and generates alternate route information in order to reroute the subscribers to that other line control equipment.

An equipment control means 34, based on the alternate route information from the alternate route searching means 31, creates exchange information consisting of the original route of the subscribers accommodated in the failed line control equipment and the alternate route indicated by the alternate route information. It also creates subscriber route information consisting of information concerning the subscribers to be rerouted and information concerning the line control equipment to which the subscribers are to be rerouted.

An exchange means 35 makes settings for switching operations based on the exchange information from the equipment control means 34. Further, a subscriber interface control means 33 performs processing for subscriber route setup based on the subscriber route information from the equipment control means 34.

In the restoration processing of FIG. 6, the equipment failure (congestion)/restoration detecting means 30 monitors the condition of each line control equipment provided within the node and detects the restoration of the line control equipment from a failure (including congestion).

Here, the equipment control means 34, based on a restoration notification from the equipment failure (congestion)/restoration detecting means 30, creates exchange information for route restoration, which consists of information concerning the subscribers who were using the restored line control equipment as the basic route and communication route information including the subscribers' current alternate route information. It also creates subscriber route information consisting of information concerning the subscribers to be switched back to the basic route and information concerning the restored line control equipment.

The exchange means 35 makes settings for switching operations based on the exchange information from the equipment control means 34. Further, the subscriber interface control means 33 performs processing for subscriber route setup based on the subscriber route information from the equipment control means 34.

In the above description of FIGS. 5 and 6, no mention has been made of the tables 32, 37, 36, and 38 shown in the figures, but these tables will be explained in connection with more detailed embodiments of the intranode alternate route generation apparatus subsequently described.

FIGS. 7 to 11B show examples of processing flows carried out in the respective means shown in FIGS. 5 and 6.

Figure 7:
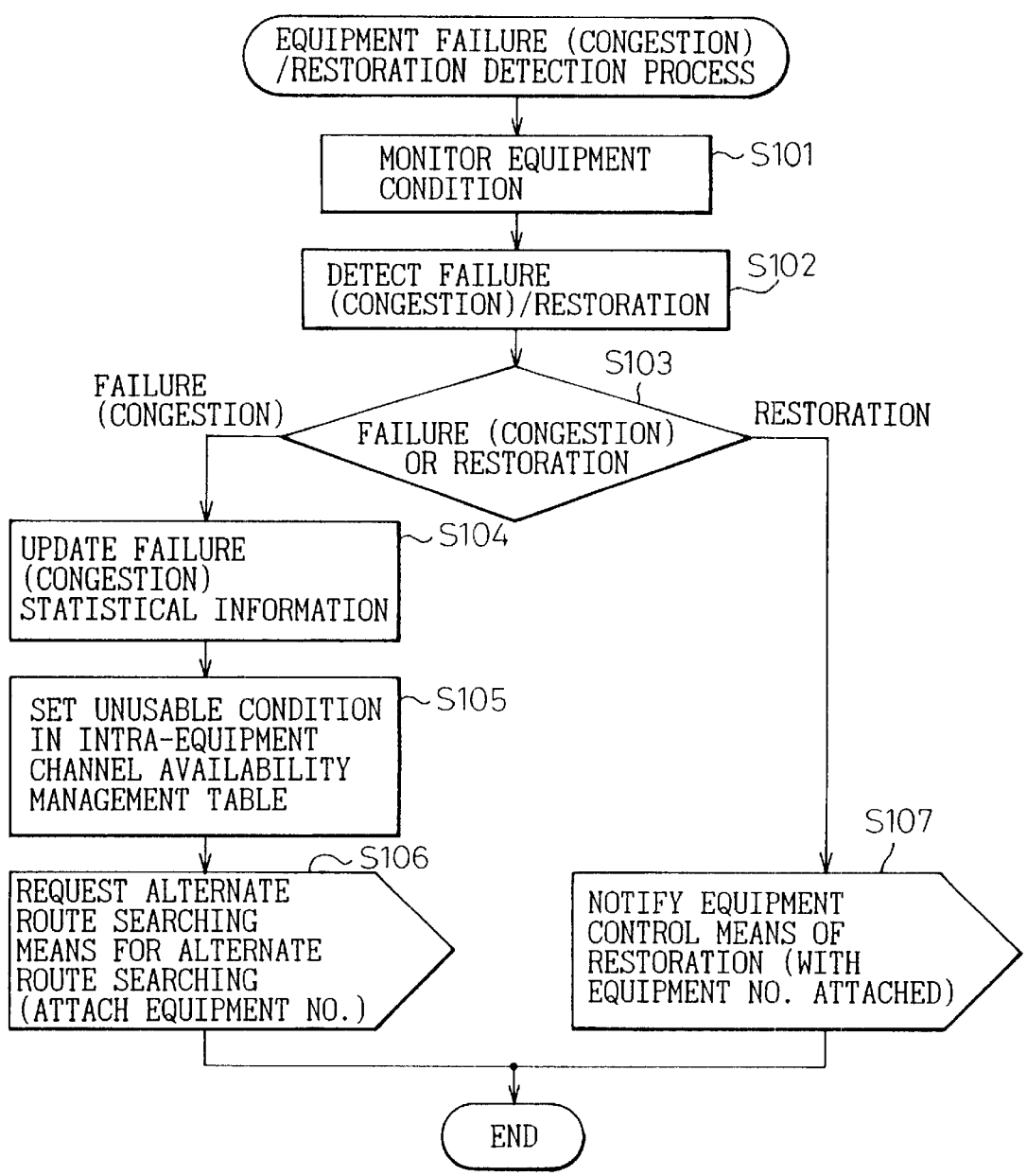
FIG. 7 is a diagram showing an example of a processing flow in an equipment failure (congestion)/restoration detecting means.
Figure 8:
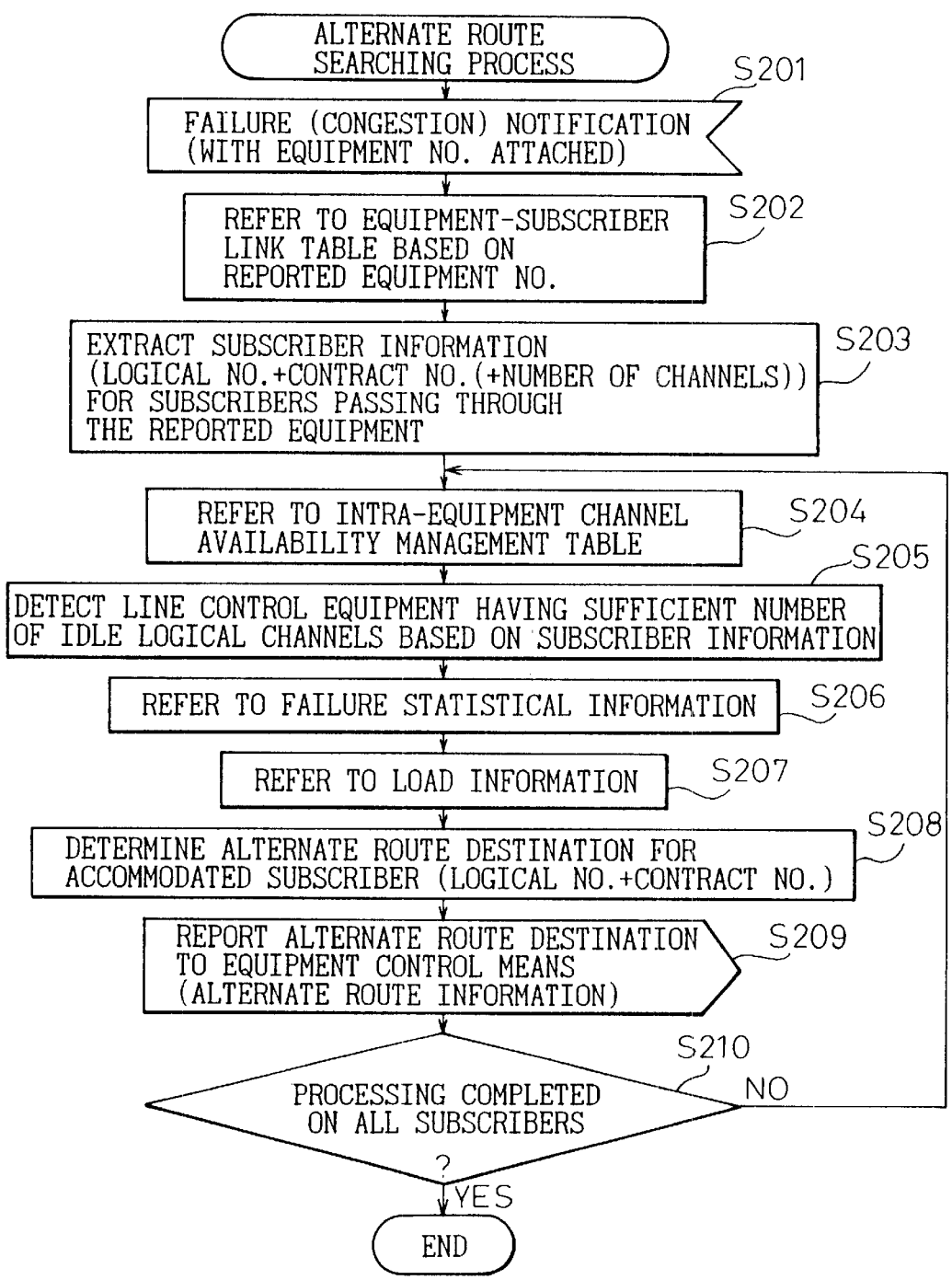
FIG. 8 is a diagram showing an example of a processing flow in an alternate route searching means.
Figure 9:
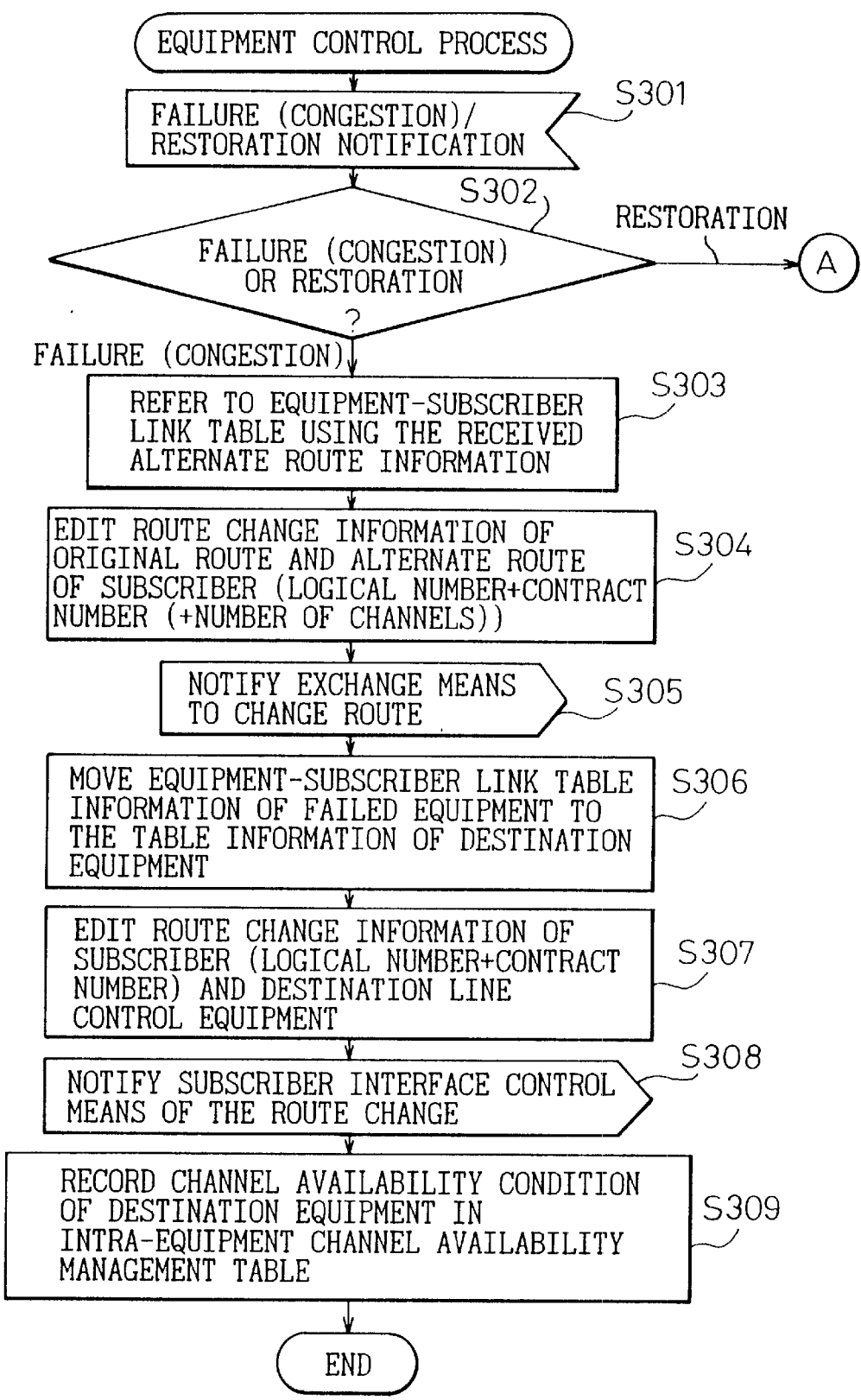
FIG. 9 is a diagram showing an example of a processing flow (1) in an equipment control means.
Figure 11A:
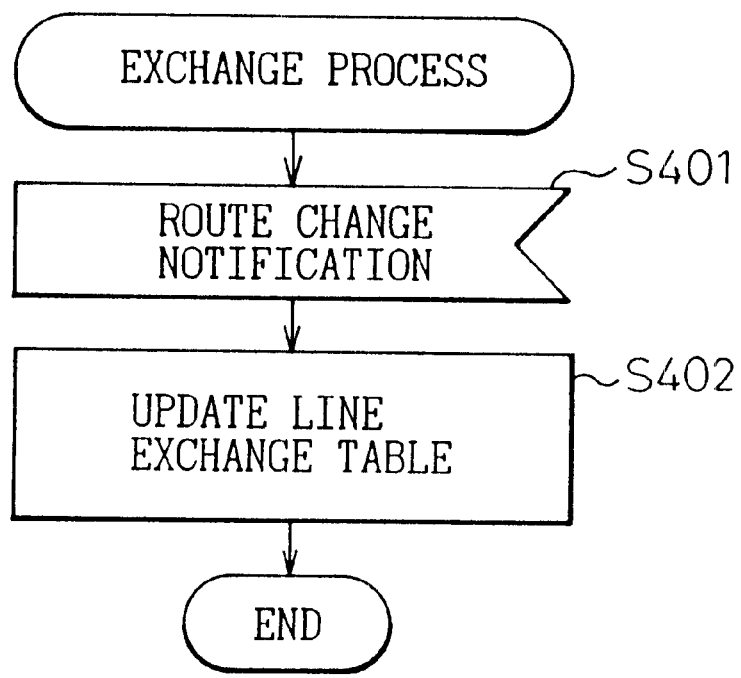
FIGS. 11A and 11B are diagrams showing examples of processing flows in an exchange means and a subscriber interface control means, respectively.
Figure 11B:
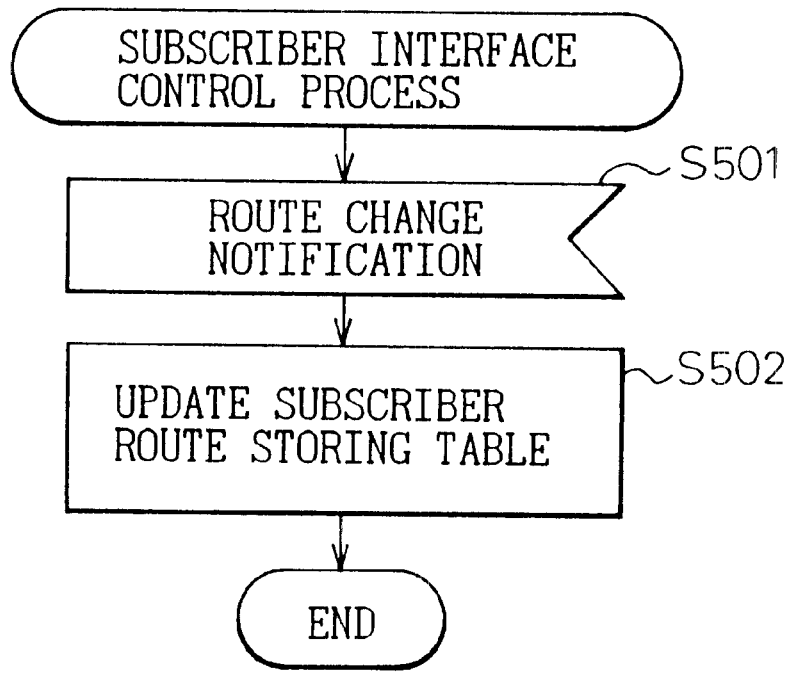

FIG. 7 shows an example of the processing flow in the equipment failure (congestion)/restoration detecting means 30, FIG. 8 gives an example of the processing flow in the alternate route searching means 31, FIGS. 9 and 10 depict an example of the processing flow in the equipment control means 34, and FIG. 11 illustrates an example of the processing flow in the exchange means 35 (FIG. 11A) and an example of the processing flow in the subscriber interface control means 33 (FIG. 11B), respectively.

Figure 12:
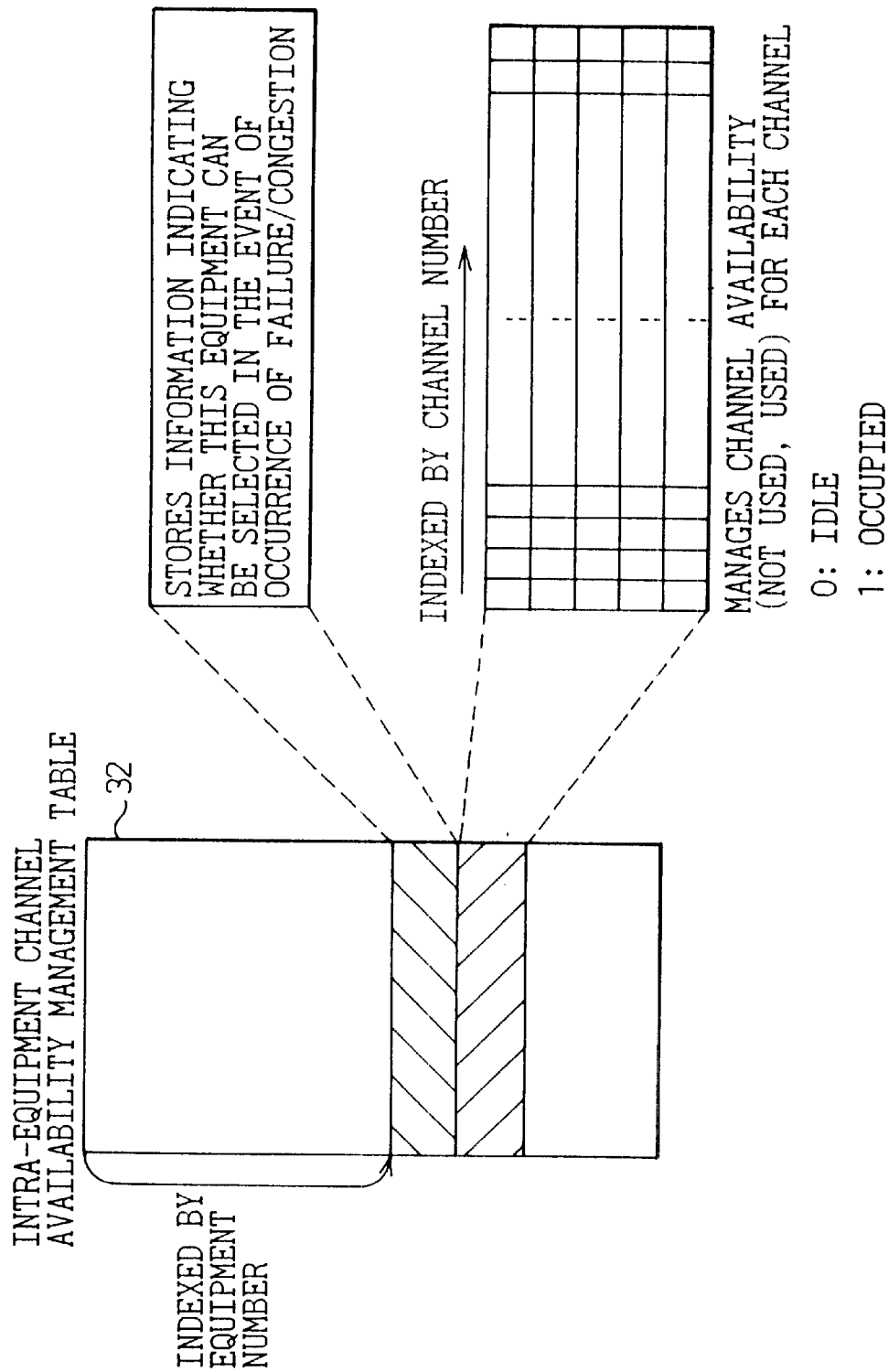
FIG. 12 is a diagram showing an example of an intra-equipment channel availability table.

FIGS. 12 to 15 show examples of the structures of the tables which are referred to in FIGS. 7 to 11B. FIG. 12 shows an example of the intra-equipment channel availability management table, FIGS. 13A and 13B depict an example of the equipment-subscriber link table, FIGS. 14A and 14B illustrate an example of the subscriber route storing table, and FIG. 15 gives an example of the line exchange table.

The following description deals mainly with the contents of the processing flows of FIGS. 7 to 11B, while making reference to FIGS. 12 to 15 as needed.

In the equipment failure (congestion)/restoration detection processing flow of FIG. 7, the equipment failure (congestion)/restoration detecting means 30 monitors the condition of each line control equipment (S101) and, upon detecting the occurrence of a failure (including congestion) in any line control equipment or the restoration thereof, notifies the alternate route searching means 31 of the occurrence and the number of the failed (congested) line control equipment in the former case (S102, 103, and 106).

In the process, an unusable condition is set in the intra-equipment channel availability table 32 (FIGS. 5 and 6) for the failed line control equipment in order to prohibit the use of that equipment (S105). As shown in FIG. 12, the intra-equipment channel availability table 32 indexes the information of each line control equipment by line control equipment number.

In the higher part of the information is stored the information indicating whether the line control equipment is usable or unusable (for example, usable=0, unusable=1), and in the lower part is stored the information indicating the channel availability condition for each channel (for example, idle=0, occupied=1) for all the channels that can be accommodated in the line control equipment. The latter information is indexed by channel number.

On the other hand, when the restoration of the line control equipment is detected, for example, by replacing it with a properly functioning line control equipment package, the equipment failure (congestion)/restoration detecting means 30 directly notifies the equipment control means 34 of the restoration and the restored line control equipment number (S103 and 107). The processing in step S104 in the failure (congestion) detection flow will be described later.

In the alternate route searching processing flow of FIG. 8, when notified by the equipment failure (congestion)/restoration detecting means 30 of the detection of a failure (congestion) and the number of the failed (congested) line control equipment (S201), the alternate route searching means 30 refers to the equipment-subscriber link table 37 based on the number of the line control equipment (S202). As illustrated in the example shown in FIGS. 13A and 13B, the equipment-subscriber link table 37 is indexed by line control equipment number, and its address indicates the beginning of the table block where information concerning the subscribers accommodated in the line control equipment is stored.

As shown in FIG. 13A, the link information consists of two kinds of information: link information (basic route information) concerning the subscribers using that line control equipment as the basic route (initially set-up route) and link information (communication route information) concerning the subscribers currently using that line control equipment. The communication route information may contain more than one piece of communication route information including the rerouted communication route information.

The basic route information is unique to each individual line control equipment and will not be changed or erased by a line failure, rerouting, etc. This information is used to restore the initial condition from the failure, as will be described later. On the other hand, the communication route information is, in its initial setting, a duplicate copy of the basic route information. At the time of rerouting due to a failure or the like, the communication route information is moved to the line control equipment selected as the destination of the rerouting and incorporated into the communication route information of that line control equipment.

As an example, in the previously described condition of FIG. 4B, after the occurrence of a failure in the line control equipment 14-1, only the basic route information is left in the area of the line control equipment 14-1 in the equipment-subscriber link table 37. The communication route information of the original line control equipment 14-1 is moved to the area of the destination line control equipment 14-2 in the same table and stored there along with the basic route information and its copy, i.e., the communication route information, of the line control equipment 14-2.

Figure 13B:
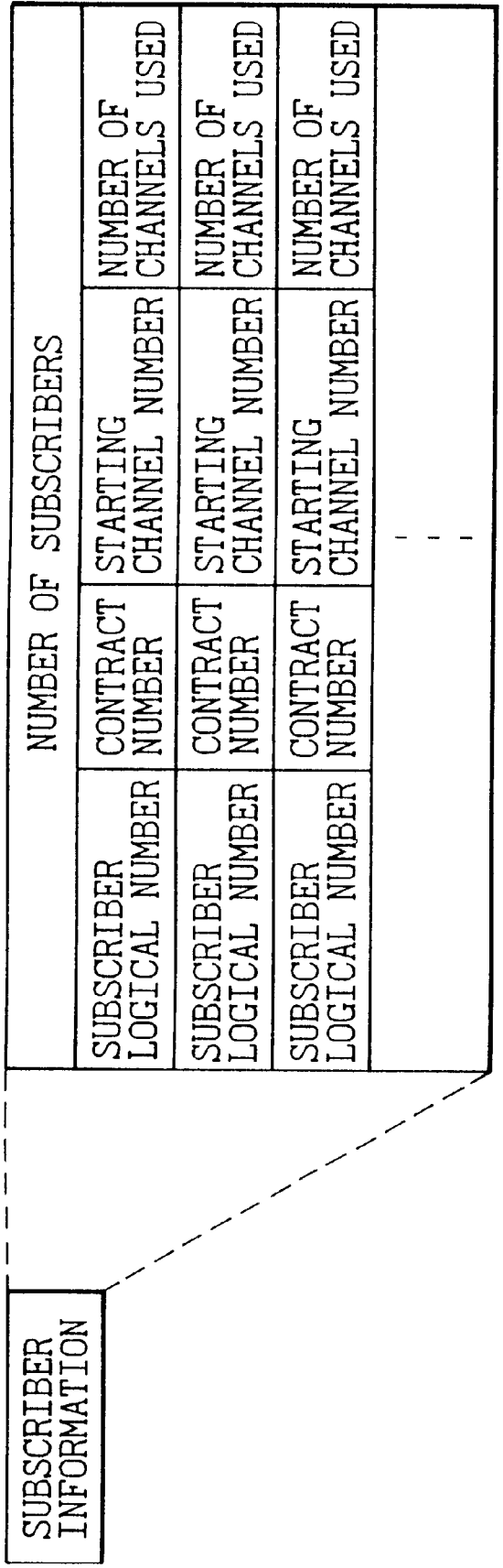

Either route information is of the same format, as shown in FIG. 13B. The information includes subscriber information (logical number+contract number), the number of channels required by the subscriber, its starting channel number, etc. The contract number here indicates the identification number of each contract when the subscriber has more than one contract for the use of channels.

Turning back to FIG. 8, the alternate route searching means 31 extracts from the communication route information of the failed line control equipment the subscriber information (logical number+contract number) for the subscribers passing through the failed line control equipment and the total number of channels required by the subscribers (S203).

Next, by referring to the intra-equipment channel availability management table 32, the alternate route searching means 31 searches for a normally operating line control equipment (the condition is set to usable) that has a sufficient number of idle channels that can accommodate the number of channels extracted from the failed line control equipment (S204 and 205).

Various search criteria can be used for the searching; for example, (1) only the line control equipment capable of accommodating all the extracted channels is selected, (2) a plurality of line control equipments, one for each extracted channel or each capable of additionally accommodating some of the extracted channels, are selected, (3) at that time, a line control equipment having channels currently being used as well as channels currently not used is preferentially selected, and (4) in the case of congestion processing, searching for the alternate route destination is conducted by considering the importance (attribute) of each subscriber. Based on the result of the searching, the alternate route destination is determined (S208).

The alternate route information concerning the alternate route destination is supplied to the equipment control means together with the failed line control equipment number (S209). In the case of the above search criteria (2), the process from step S204 through step S210 is repeated until alternate routing is completed for all the extracted subscribers (S210). The processing in steps S206 and 207 in this processing flow will be described later.

In the equipment control processing flow of FIG. 9, upon receiving the alternate route information and the failed line control equipment number from the alternate route searching means 31 (S301), the equipment control means 34 initiates the failure (congestion) processing described in steps S303 to 309 (S302).

First, the equipment control means 34 indexes into the equipment-subscriber link table 37 using the received line control equipment number, to confirm the current route (before changing) of each reported subscriber (logical number+contract number), and makes a request to the exchange means 35 to change the route by using the confirmed current route and the received new alternate route information as key information (S303 to 305). Then, as previously described with reference to FIG. 13A, the equipment control means 34 adds the communication route information of the failed line control equipment to the communication route information of the destination line control equipment in the equipment-subscriber link table 37 (transfer of the communication route information from the failed equipment to the destination equipment) (S306).

Next, the equipment control means 34 notifies the subscriber interface control means 33 of the affected subscribers (logical number+contract number) and the number of their new line control equipment, and makes a request to rewrite the contents of the subscriber route storing table 36 (S307 and 308). Finally, the equipment control means 34 changes the channel availability condition of the newly added channels to OCCUPIED in the channel area of the destination line control equipment in the intra-equipment channel availability management table 32 (S309).

On the other hand, in the equipment restoration control processing flow of FIG. 10, upon receiving the equipment restoration notification and the restored line control equipment number from the equipment failure (congestion)/restoration detecting means 30 (S301), the equipment control means 34 initiates the restoration processing described in steps S310 to 319 (S302).

To perform switching back from the alternate route, the equipment control means 34 searches the equipment-subscriber link table 37 using the received line control equipment number, and extracts each subscriber (logical number+contract number) using the basic route from the basic route information (FIG. 13A) of the restored line control equipment (S310 and 311). The equipment control means 34 repeats the following processing for each extracted subscriber (logical number+contract number) (S319).

Using the extracted subscriber (logical number+contract number) as key information, the equipment control means 34 refers to the subscriber route storing table 36 to find the line control equipment currently serving the subscriber (logical number+contract number) (322). As illustrated in the example shown in FIGS. 14A and 14B, the subscriber route storing table 36 is indexed by subscriber logical number. This table stores two kinds of information similar in format to the example of the equipment-subscriber link table 32 shown in FIGS. 13A and 13B; that is, equipment information (basic route information) for the basic route (initially set-up route) and equipment information (communication route information) for the communication route currently used.

Figure 14B:
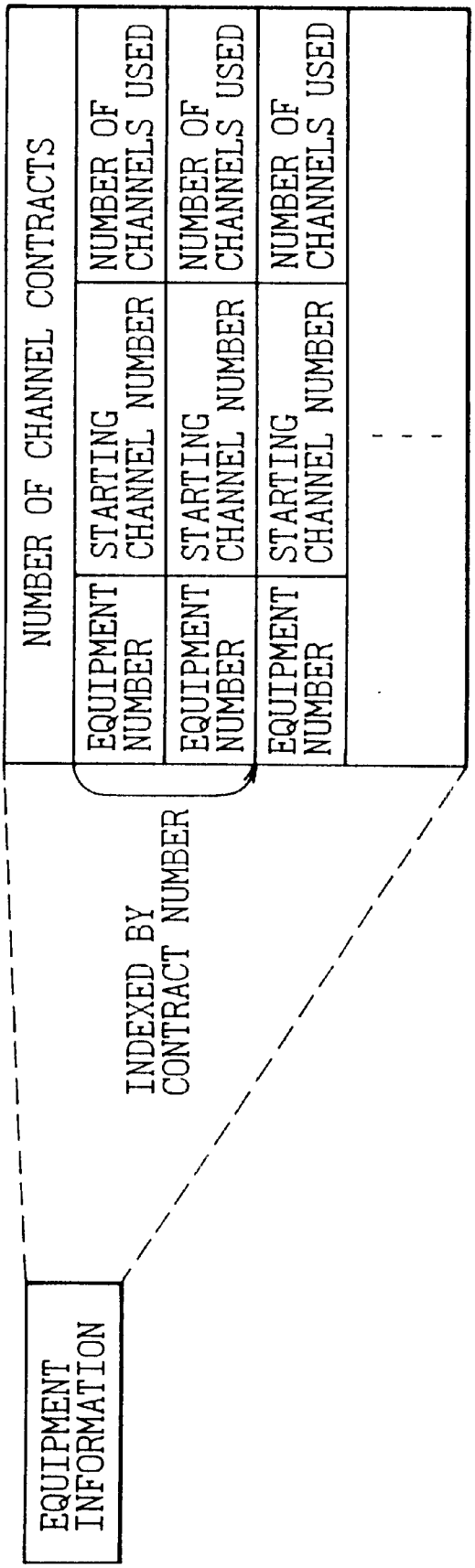

The basic route information is unique to each individual subscriber and will not be changed or erased. On the other hand, the communication route information is, in its initial setting, a duplicate copy of the basic route information, but unlike the case of FIGS. 13A and 13B, this route information is updated to the equipment information of the destination line control equipment when the initial equipment information is changed. Either route information is of the same format, as shown in FIG. 14B, and consists of prescribed equipment information (equipment number, starting channel number, the number of channels used, etc). In the illustrated example, more than one piece of equipment information is allocated to each subscriber to correspond with his contract numbers.

Turning back to FIG. 10, the equipment control means 34 requests the exchange means to change the route by using as the key information the restored line control equipment number, the starting channel number/the number of channels obtained for each subscriber (logical number+contract number) from the equipment-subscriber link table 37, and the starting channel number/the number of channels and the identification number of the currently serving line control equipment obtained for the same subscriber (logical number+contract number) from the subscriber route storing table 36 (S313 and 314).

Using the identification number of the restored line control equipment, the subscriber information (logical number+contract number) obtained from the identification number, and the identification number of the currently serving line control equipment as the key information, the equipment control means 34 updates the contents of the equipment-subscriber link table 37. More specifically, the portions concerning the communication route information of the restored line control equipment which are contained in the communication route information of the currently serving line control equipment are moved back to the communication route information of the restored line control equipment (S315).

Next, the equipment control means 34 notifies the subscriber interface control means 33 of the subscriber (logical number+contract number) and makes a request to rewrite the contents of the subscriber route storing table 36 (S316 and 317). Finally, the equipment control means 34 sets the condition of the restored line control equipment to USABLE in the intra-equipment channel availability management table 32, and changes the availability condition of the restored channels in the restored line control equipment to OCCUPIED in the channel area thereof. At the same time, the channel availability condition of the corresponding channels in the previously serving line control equipment is set back to IDLE (S318).

In the exchange processing flow and the subscriber interface processing flow respectively illustrated in FIGS. 14A and 14B, in both cases of failure (congestion) and restoration, the line exchange table 38 is updated in the exchange processing (S401 and 402) and the subscriber route storing table 36 is updated in the subscriber interface processing (S501 and 502) in accordance with the notification (request) from the equipment control means 34 (S305, 308, 314, and 317).

An example of the subscriber route storing table 36 has already been described with reference to FIGS. 14A and 14B. Now, the example of the line exchange table 38 shown in FIG. 15 will be described briefly. As shown in FIG. 15, information concerning each subscriber within the line exchange table 38 is accessed using an index table based on the logical number and contract number of the subscriber. In the table, incoming and outgoing switching information (subscriber's logical number, contract number, and route equipment on each of the incoming and outgoing sides) is recorded for each subscriber.

FIGS. 16A to 18B show specific examples of the present invention so far described.

FIGS. 16A and 16B show one example of equipment configuration, FIGS. 17A and 17B show an example of how the equipment-subscriber link table in FIGS. 16A and 16B is set, and FIGS. 18A and 18B show an example of how the subscriber route storing table in FIGS. 16A and 16B is set.

The example of the equipment configuration shown in FIGS. 16A and 16B correspond to the previously described equipment configuration of FIG. 4A. That is, the line control equipments 14-1 and 14-2 are currently in use, and the line control equipment 14-3 is in an unused (idle) condition. In the example shown here, two channels are assigned to each of the subscriber logical numbers 11, 12, 21, and 22, assuming, for example, the use of B1 and B2 channels of ISDN. Therefore, contract numbers 1 and 2 are given to each subscriber.

In the equipment-subscriber link table 37 shown in FIGS. 17A and 17B, the basic route information and communication route information for the subscribers accommodated in each of the line control equipments 14-1 and 14-2 are recorded in the table block indexed by the corresponding line control equipment number (see FIGS. 13A and 13B). The example shows the condition before the occurrence of a failure; therefore, the contents of the basic route information are identical to the contents of the communication route information. Further, since the line control equipment 14-3 is currently not used (all channels are idle), no link information to subscribers is stored there.

Figure 1:
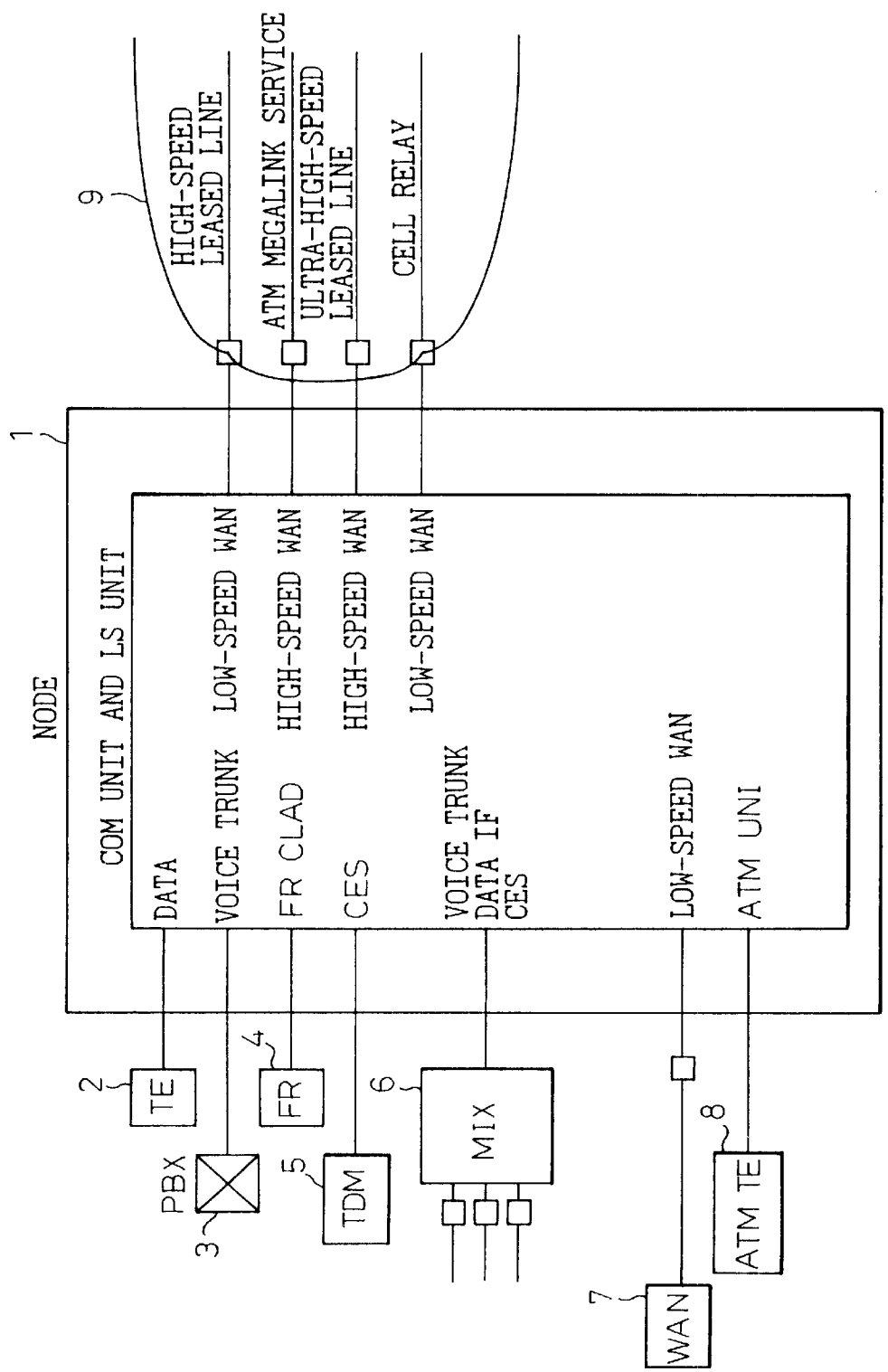
FIG. 1 is a diagram showing an example of a communication node to which the present invention is applied.
Figure 2:
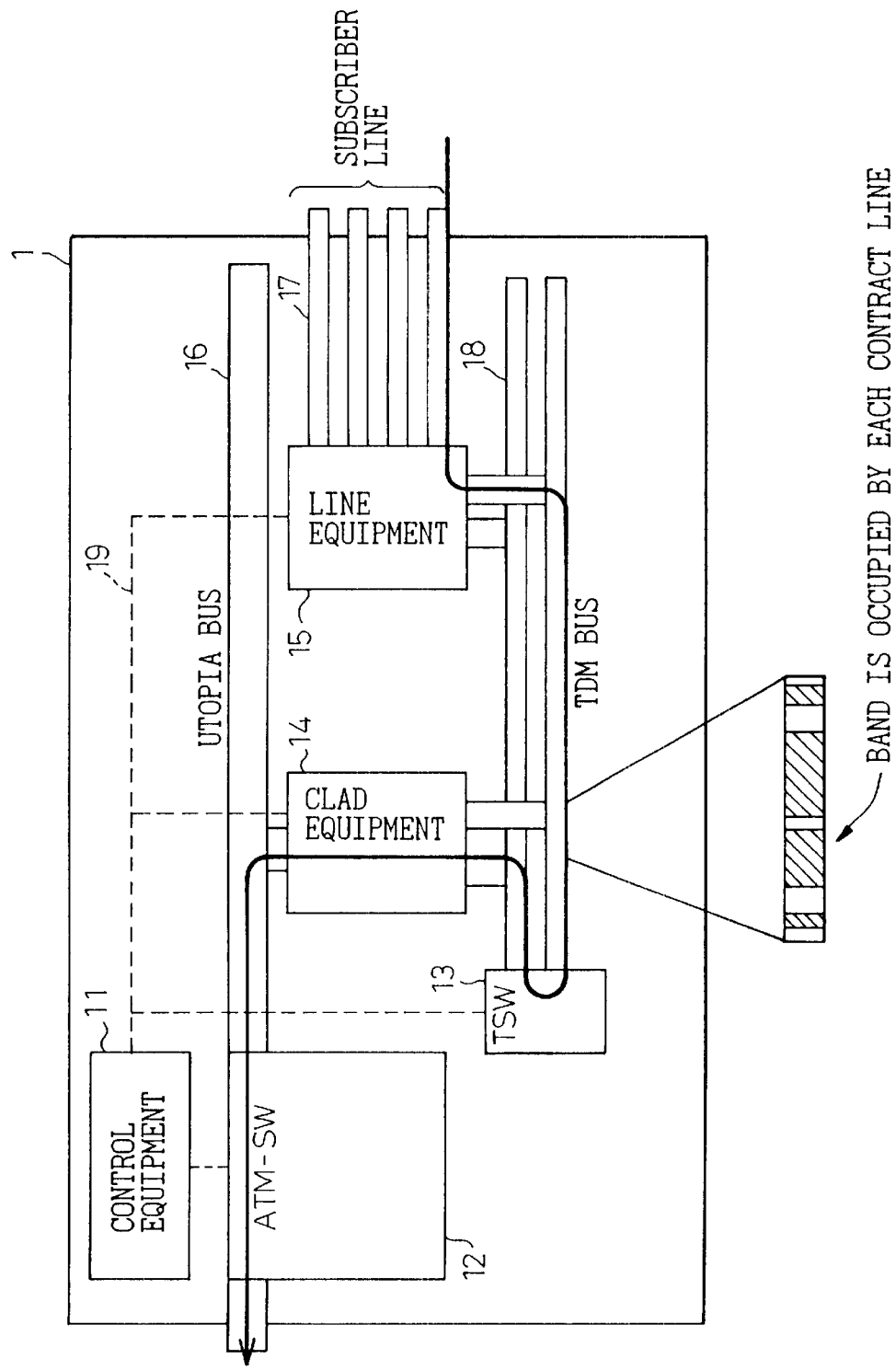
FIG. 2 is a diagram showing an example of the basic configuration of a line accommodating section in the node of FIG. 1.
Figure 3:
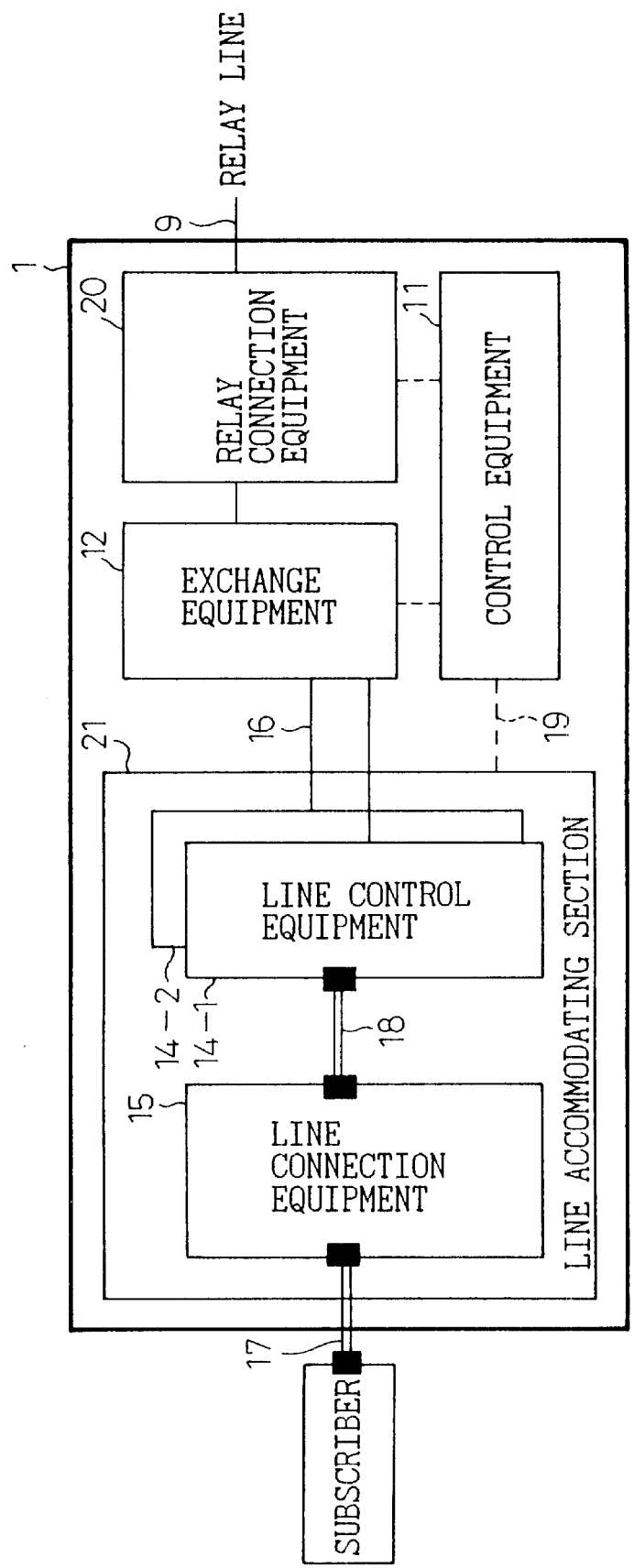
FIG. 3 is a diagram showing an example of the configuration of a line accommodating section in a prior art node.

As an example, three subscribers of subscriber logical numbers 11, 21, and 22 are linked to four channels (x1 to x4) in the currently used line control equipment 14-1, each channel being assigned as the starting channel of each subscriber logical number, except, for example, the subscriber logical number 11 to which two channels of the contract numbers 1 and 2 are assigned. As first described, each channel assumes the use of a B channel, so that the number of channels is 1 for each. Further, provisions may be made to allow each contract to use a bandwidth consisting of a plurality of channels, as shown in the lower part of FIG. 2.

In this situation, if a failure has occurred, for example, in the line control equipment 14-1, and an alternate route is formed as shown in FIG. 4B, the communication route information of the line control equipment 14-1 is added (moved) unchanged at the end of the communication route information of the line control equipment 14-2 providing the alternate route. Similarly, in the case of FIG. 4C, the communication route information of the line control equipment 14-2 (which includes the communication route information of the line control equipment 14-1) is moved to the communication route information area (empty area) of the line control equipment 14-3. In this case, only the basic route information is left in the table blocks of the failed communication control equipments 14-1 and 14-2, thus getting ready for later restoration processing.

The subscriber route storing table 36 of FIGS. 18A and 18B is indexed by the subscriber logical numbers 11, 12, 21, and 22, and stores for each subscriber logical number the number of its serving line control equipment, the starting channel, and the number of channels. FIGS. 18A and 18B show the case in which all the line control equipments are operating normally (this corresponds to the case of FIG. 4A). In the case of the subscriber logical number 11, for example, the serving line control equipment is 14-1, the starting channel is x1, and the number of channels is 1, and for the other contract number, the serving line control equipment is 14-1, the starting channel is x2, and the number of channels is 1.

In this situation, if a failure occurs in the line control equipment 14-1, and the subscriber logical number 11 is rerouted to the line control equipment 14-2, as shown in FIG. 4B, the communication route information for the subscriber logical number 11 is changed according to the new routing; for example, the serving line equipment is 14-2, the starting channel is y5, and the number of channels is 1, and for the other contract number, the serving line control equipment is 14-2, the starting channel is y6, and the number of channels is 1.

In this way, the equipment-subscriber link table 37 is used to provide the subscriber information linked to each line control equipment, while the subscriber route storing table 36 is used to provide information concerning the route between subscriber and serving line control equipment on a subscriber-by-subscriber basis. Turning back to FIGS. 16A and 16B, the line exchange table 38 stores the incoming and outgoing exchange information indexed by subscriber logical number and contract number. In the illustrated example, the channel x1 (incoming or outgoing) in the line control equipment 14-1 is switched for connection to the channel y1 (outgoing or incoming) in the line control equipment 14-2.

FIGS. 19 to 24 show alternative embodiments of the basic configuration of the intranode alternate route generation apparatus according to the present invention shown in FIGS. 5 and 6.

Figure 19:
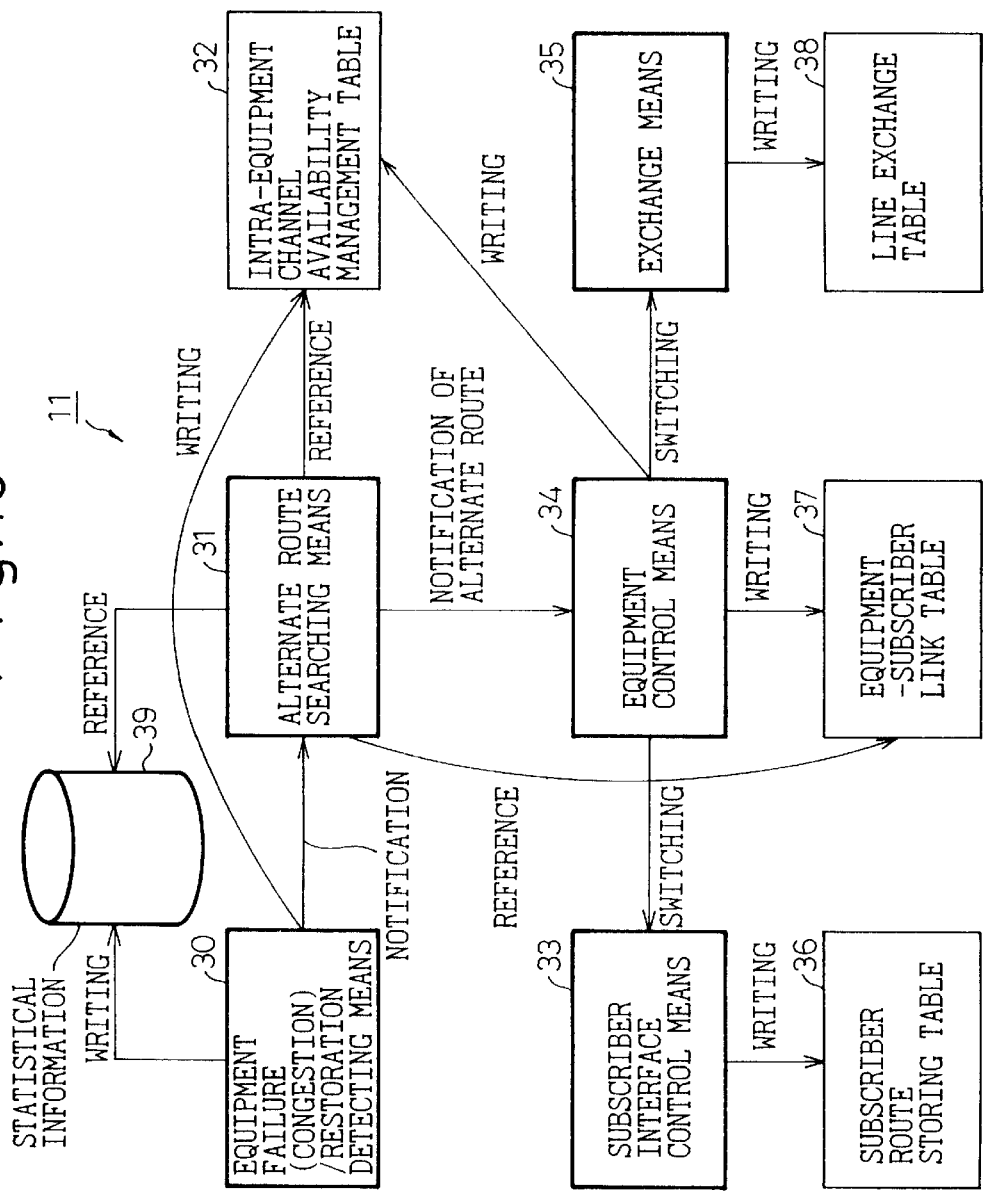
FIG. 19 is a diagram showing an alternative embodiment (1) of the intranode alternate route generation apparatus according to the present invention.
Figure 21A:
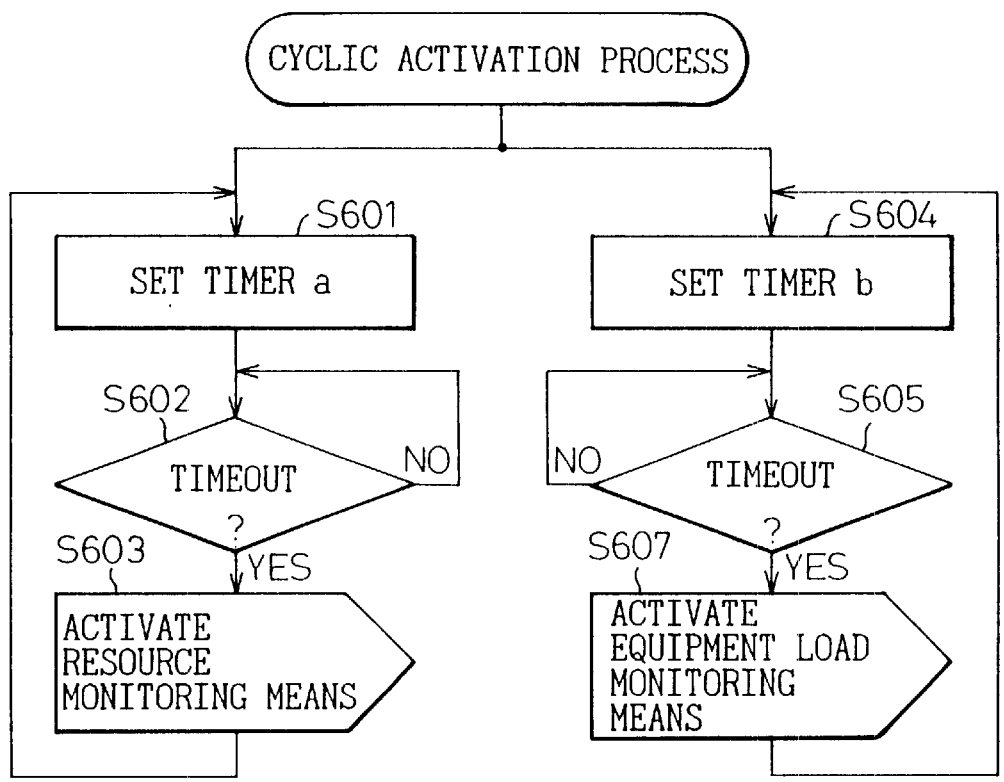
FIGS. 21A and 21B are diagrams showing examples of processing flows in a cyclic activation means and an equipment load monitoring means, respectively.
Figure 21B:
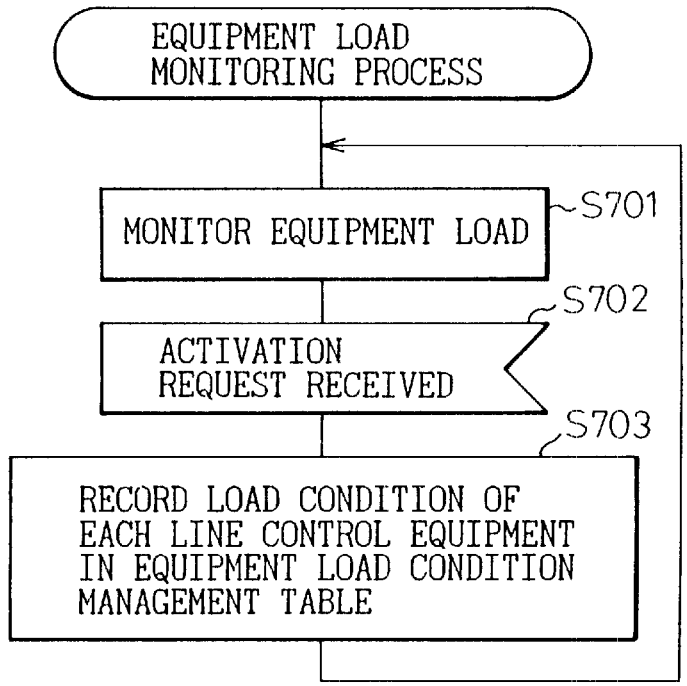
Figure 23A:
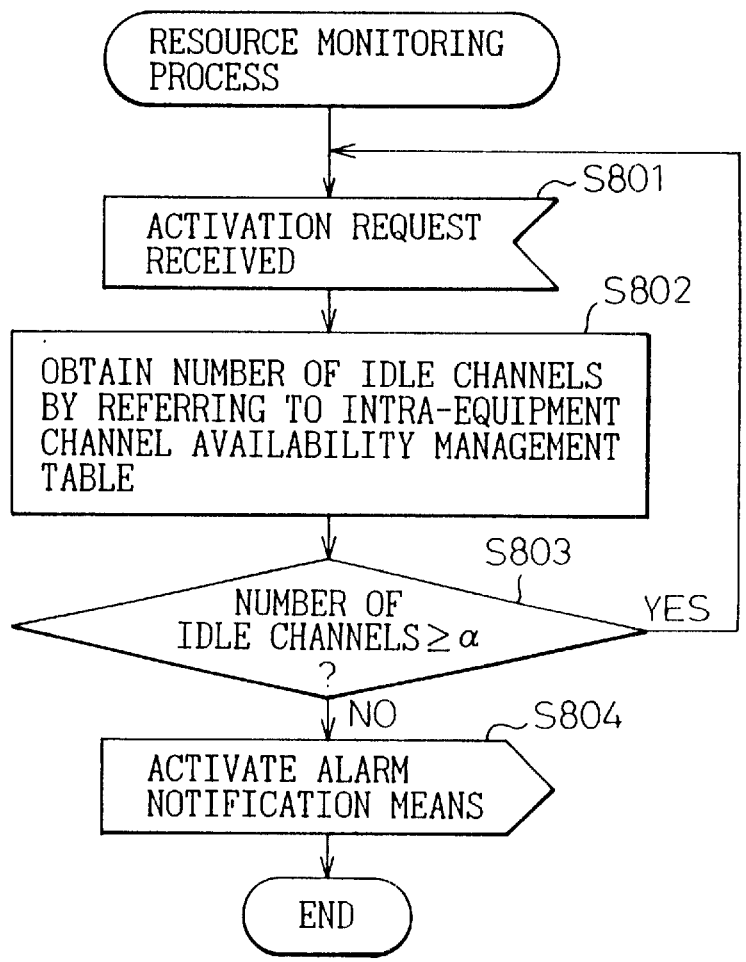
FIGS. 23A and 23B are diagrams showing examples of processing flows in a resource monitoring means and an alarm notification means, respectively.
Figure 23B:
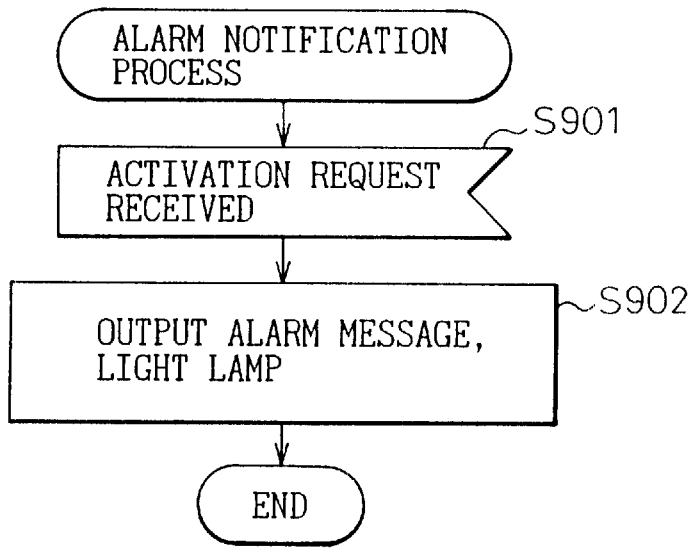
Figure 24A:
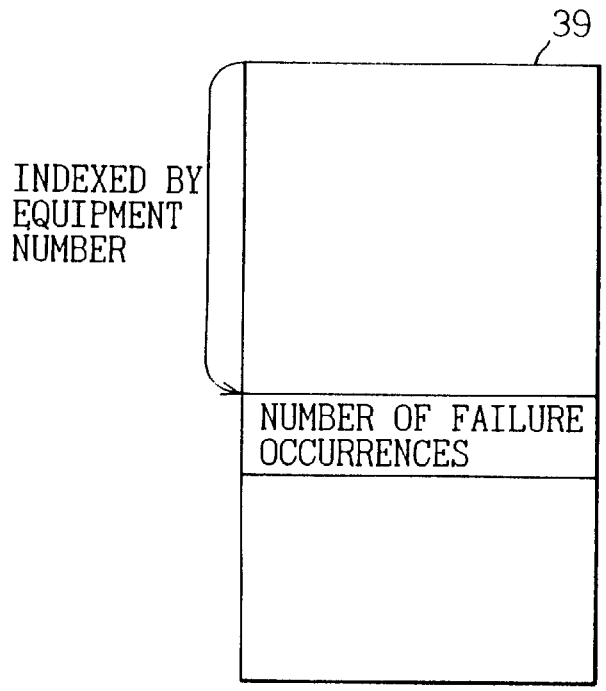
FIGS. 24A and 24B are diagrams showing examples of a statistical information recording table and a load management table, respectively.
Figure 24B:
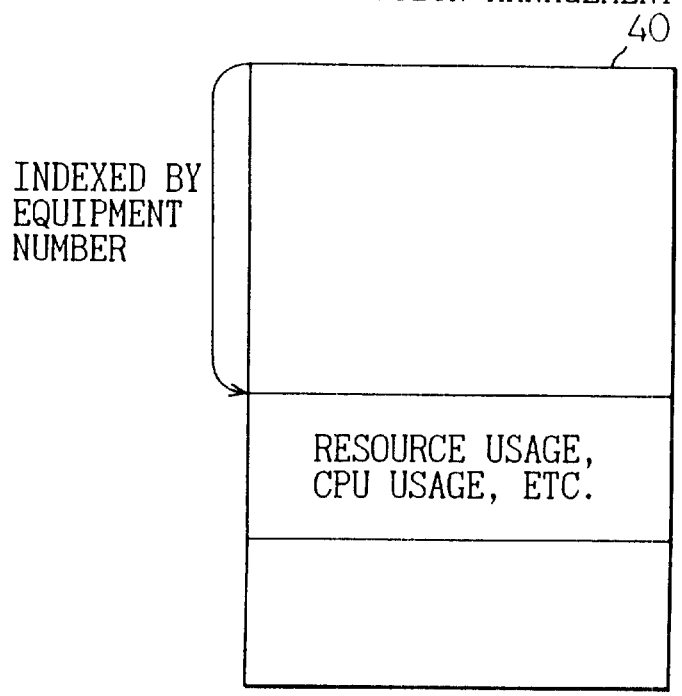

FIGS. 19, 20, and 21 respectively show different embodiments (1) to (3), FIGS. 21A, 21B, 23A, and 23B show examples of processing flows associated with the respective embodiments, and FIGS. 24A and 24B show examples of tables used in the embodiments.

FIG. 19 is a diagram showing the alternative embodiment (1) of the intranode alternate route generation apparatus according to the present invention.

In FIG. 19, a statistical information recording means 39 is added to the basic configuration of FIG. 5. In step S104 of FIG. 7, which was not described before, the equipment failure (congestion)/restoration detecting means 30 updates the statistical information on failures, etc. recorded in the statistical information recording means 39 each time a failure or congestion occurs.

FIG. 24A shows an example of a statistical information recording table as an implementation of the statistical information recording means 39. The statistical information recording table 39 is indexed by line control equipment number, and records the total number of failure occurrences for each equipment by incrementing the number of occurrences by 1 each time a failure or like event occurs.

In step S206 of FIG. 8, which was not described before, the alternate route searching means 31 selects, from among the line control equipments retrieved as alternate route candidates, the one whose number of failure (congestion) occurrences recorded in the statistical information recording means 39 is the smallest. This ensures the selection of the most reliable line control equipment.

FIG. 20 is a diagram showing the alternative embodiment (2) of the intranode alternate route generation apparatus according to the present invention.

In FIG. 20, an equipment load condition management table 40, an equipment load monitoring means 41, and a cyclic activation means 42 are added to the basic configuration of FIG. 5. The cyclic activation means 42 activates the equipment load monitoring means 41 in a given timer cycle b (load monitoring cycle), as illustrated in steps S604 to 607 of FIG. 21A.

The equipment load monitoring means 41 monitors the load condition of each of the line control equipments provided within the node, and records the load condition of each line control equipment in the equipment load condition management table 40 by being activated by the cyclic activation means 42 (S701 to 703). One example of the equipment load condition management table 40 is shown in FIG. 24B. For example, CPU usage, buffer memory usage, etc. can be used as the load information.

With this arrangement, the equipment failure (congestion)/restoration detecting means 30 can detect a congestion condition (S102) by referring to the equipment load condition management table 40 when monitoring the equipment condition in step S101 of FIG. 7. In step S207 of FIG. 8, which was not described before, the alternate route searching means 31 refers to the equipment load condition management table 40 and selects the line control equipment whose load at that instant in time is the smallest from among the line control equipments retrieved as alternate route candidates. This serves to prevent the occurrence of a congestion condition.

Figure 22:
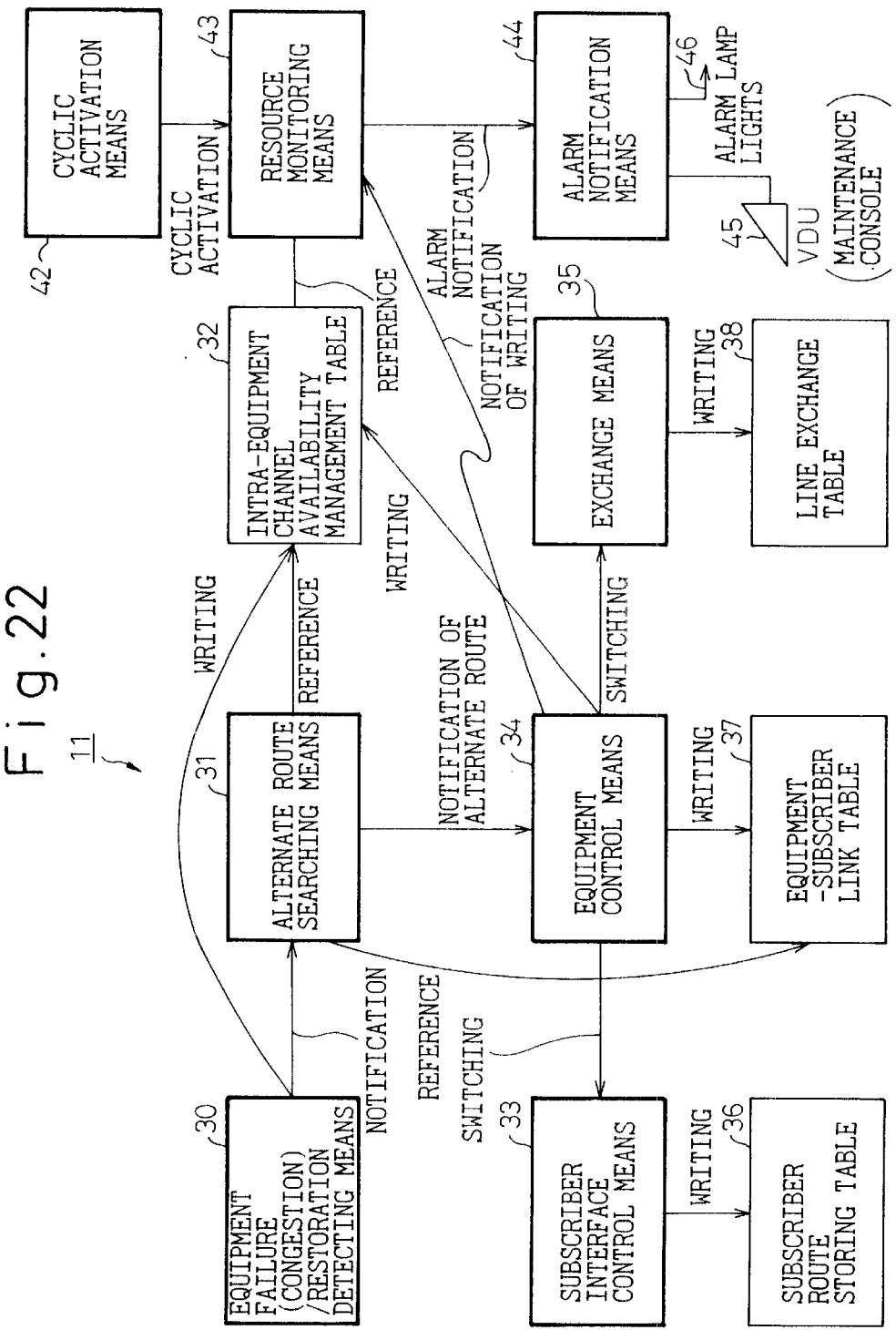
FIG. 22 is a diagram showing an alternative embodiment (3) of the intranode alternate route generation apparatus according to the present invention.

FIG. 22 shows the alternative embodiment (3) of the intranode alternate route generation apparatus according to the present invention.

In FIG. 22, a cyclic activation means 42, a resource monitoring means 43, and an alarm notification means 44 are added to the basic configuration of FIG. 5. The cyclic activation means 42 activates the resource monitoring means 43 in a given timer cycle a (resource monitoring cycle), as illustrated in steps S601 to 603 of FIG. 21A. The resource monitoring means 43 is also activated by the equipment control means 34 when the equipment control means 34 updates the intra-equipment channel availability management table 32.

As shown in FIG. 23A, when activated, the resource monitoring means 43 refers to the intra-equipment channel availability management table 32 to obtain the total number of idle channels available in the equipments usable at that instant in time (S801 and 802). The resource monitoring means 43 activates the alarm notification means 44 when the total number of available idle channels decreases and drops below a predetermined value (S803 and 804).

As shown in FIG. 23B, the alarm notification means 44, when activated, displays an alarm message on a console 45 or lights an alarm lamp to indicate to maintenance personnel that rerouting is becoming difficult because the resources are getting low (S901 and 902).

As described above, according to the present invention, when the serving line control equipment is rendered unsuitable for use, an alternate route is selected/generated by dynamically and selectively using idle logical channels; this eliminates the need for the provision of redundant equipment and achieves efficient equipment operation.

Further, when the line control equipment is restored from the failure or congestion, the line can be automatically restored onto the original route by releasing the alternate route formed in other line control equipment.

Moreover, as long as idle logical channels are available in other equipment, line control operations can be continued without interruption even in the event of a double failure condition. Furthermore, when selecting or restoring the route, the most suitable line control equipment at that time is selected based on the failure/congestion statistical information, thus achieving proper equipment operation and maintenance.

What is claimed is:

1. In a node having a line accommodating section comprising a line connection equipment, a plurality of line control equipments and an exchange section for performing switching of signals supplied from said line accommodating section, an intranode alternate route generation apparatus for generating an alternate route within said node, comprising:

detecting means for detecting an unusable condition when any one of said line control equipments becomes unusable;

extracting means for extracting idle channels from channels accommodated in another operating line control equipment when said unusable condition is detected;

linking means for dynamically linking the channels accommodated in said unusable line control equipment to said extracted idle channels in said other operating line control equipment by way of an alternate route; and information collecting means for collecting information concerning the condition of each line control equipment, wherein
      based on said information from said information collecting means, said extracting means preferentially extracts idle channels from channels accommodated in a line control equipment having higher reliability.

2. An apparatus according to claim 1, wherein said information collected by said information collecting means contains the number of idle channels, the number of occurrences of a failure, resource information, or load information for each line control equipment.

3. An apparatus according to claim 2, further comprising alarm means for outputting alarm information when the total number of idle channels available between each line control equipment drops below a predetermined value.

4. An apparatus according to claim 3, wherein said unusable condition of a line control equipment detected by said detecting means includes a failure or congestion of the line control equipment.

5. An apparatus according to claim 1, wherein one or more line control equipments are designated by said linking means as destinations of said linking.

6. An apparatus according to claim 1, wherein when the line control equipment designated by said linking means as the destination of said alternate route also becomes unusable, an alternate route is formed to still another operating line control equipment by said detecting means, said extracting means, and said linking means.

7. An apparatus according to claim 1, wherein said detecting means further detects a restored condition when said unusable line control equipment is restored from said unusable condition and becomes usable, and in response to the detection of said restored condition, said linking means switches back said alternate route associated with the channels originally accommodated in said restored line control equipment.

8. An apparatus according to claim 7 wherein when switching back said alternate route, said linking means uses basic route information which records initially accommodated channels for each line control equipment.

9. A node having a line accommodating section comprising a line connection equipment, a plurality of line control equipments, an exchange section for performing switching of signals supplied from said line accommodating section, and a control section for controlling said line accommodating section and said exchange section, said control section comprising:

equipment failure/congestion detecting means for monitoring the condition of each line control equipment, and for detecting a failure or congestion thereof;

equipment restoration detecting means for monitoring the condition of each line control equipment, and for detecting restoration from said failure or congestion;

alternate route searching means for searching, upon receiving a notification from said equipment failure/congestion detecting means of the detection of a failure or congestion of a line control equipment, for other operating line control equipment capable of accommodating subscribers currently being served by said failed or congested line control equipment, and for creating alternate route information for rerouting said subscribers to said other line control equipment by way of an alternate route;

equipment control means for creating, based on said alternate route information from said alternate route searching means, exchange information and subscriber route information for setting up said alternate route, or creating, in response to a restoration detection notification from said equipment restoration detecting means, exchange information and subscriber route information for switching back the originally accommodated subscribers to said restored line control equipment;

exchange means for performing exchange setup processing based on said exchange information supplied from said equipment control means; and subscriber interface control means for performing subscriber route setup processing based on said subscriber route information supplied from said equipment control means.

10. A node according to claim 9, further comprising an intra-equipment channel availability management table for managing a usable/unusable condition of each line control equipment as well as an idle/occupied condition of each accommodated channel.

11. A node according to claim 10, wherein when a failure or congestion of a line control equipment is detected, said equipment failure/congestion detecting means sets an unusable condition at a corresponding line control equipment entry in said intra-equipment channel availability management table.

12. A node according to claim 10, wherein when searching for said other operating line control equipment, said alternate route searching means searches for idle channels available in a line control equipment for which a usable condition is set in said intra-equipment channel availability management table.

13. A node according to claim 10, wherein said equipment control means updates channel availability information in said intra-equipment channel availability management table in the event of a route change or restoration.

14. A node according to claim 10, wherein, when setting up said alternate route, said equipment control means moves the communication route information of said failed line control equipment to the communication route information of said other operating line control equipment and, after restoration from said alternate route, switches back the corresponding alternate route in accordance with said basic route information and deletes the restored communication route information from the communication route information of said other operating line control equipment.

15. A node according to claim 14, wherein said alternate route searching means obtains information concerning the subscribers currently accommodated in each line control equipment from said communication route information (including said moved and added communication route information).

16. A node according to claim 9, further comprising an equipment-subscriber link table which records link information to accommodated subscribers for each line control equipment.

17. A node according to claim 16, wherein said equipment-subscriber link table carries basic route information, which is link information to the subscribers using each line control equipment as a basic route, and communication route information, which is link information between the currently serving line control equipment and said subscriber.

18. A node according to claim 9, further comprising a subscriber route storing table which records information concerning a serving line control equipment for each subscriber.

19. A node according to claim 18, wherein said equipment control means refers to said subscriber route storing table on the basis of information concerning the subscribers initially accommodated in said restored line control equipment and obtains information concerning their currently serving line control equipment.

20. A method for generating/restoring an alternate route within a node having a line accommodating section comprising a line connection equipment and a plurality of and line control equipments, comprising the steps of;

detecting an unusable condition when any one of said line control equipments becomes unusable;

extracting idle channels from channels accommodated in other operating line control equipment when said unusable condition is detected;

dynamically linking the channels accommodated in said unusable condition detected line control equipment to said extracted idle channels by way of an alternate route; and collecting information concerning the condition of each line control equipment, wherein
    based on said information collected, idle channels from channels accommodated in a line control equipment having higher reliability are preferentially extracted.

21. A method according to claim 20, further including the steps of:

detecting a usable condition when said unusable line control equipment becomes usable; and switching back the corresponding alternate route in accordance with information concerning the channels originally accommodated in said line control equipment.

* * * * *